(12) United States Patent
Kraft et al.

(10) Patent No.: US 7,350,142 B2
(45) Date of Patent: *Mar. 25, 2008

(54) METHOD AND SYSTEM FOR CREATING A TABLE VERSION OF A DOCUMENT

(75) Inventors: Tara M. Kraft, Seattle, WA (US); Uladzislau Sudzilouski, Sammamish, WA (US); Jacqui J. Salerno, Tacoma, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/142,596

(22) Filed: Jun. 1, 2005

(65) Prior Publication Data

US 2005/0210372 A1    Sep. 22, 2005

(51) Int. Cl.
*G06F 15/00* (2006.01)
*G06F 17/00* (2006.01)

(52) U.S. Cl. .............. 715/517; 715/502; 715/503; 715/513; 715/520; 715/521; 715/523; 715/529; 715/539; 715/540

(58) Field of Classification Search ............ 715/517, 715/503, 513, 520, 521, 523, 529, 539, 540, 715/502

See application file for complete search history.

(56) References Cited

U.S. PATENT DOCUMENTS

| | | | | |
|---|---|---|---|---|
| 4,953,108 A * | 8/1990 | Kato et al. | .............. | 715/509 |
| 5,379,372 A * | 1/1995 | Wu | .............. | 715/506 |
| 5,835,916 A * | 11/1998 | Inaki et al. | .............. | 715/509 |
| 5,893,127 A * | 4/1999 | Tyan et al. | .............. | 715/513 |
| 6,088,708 A * | 7/2000 | Burch et al. | .............. | 715/509 |
| 6,230,174 B1 * | 5/2001 | Berger et al. | .............. | 715/513 |
| 6,691,281 B1 * | 2/2004 | Sorge et al. | .............. | 715/503 |
| 2005/0091607 A1 * | 4/2005 | Satou et al. | .............. | 715/788 |
| 2005/0210371 A1 * | 9/2005 | Pollock et al. | .............. | 715/509 |
| 2006/0285172 A1 * | 12/2006 | Hull et al. | .............. | 358/448 |
| 2007/0198917 A1 * | 8/2007 | Rohrabaugh et al. | .......... | 715/513 |

OTHER PUBLICATIONS

"Web Application Slicing," F. Ricca and P. Tonella, Proceedings of the International Conference on Software Maintenance, Firenze, Italy, 2001, pp. 148-157.*

"Macromedia Fireworks 4 for Window and Macintosh: Visual Quickstart Guide," Sandee Cohen; Peachpit Press; Feb. 13, 2001; Safari Tech Books Online; downloaded pages marked 1-66.*

(Continued)

*Primary Examiner*—Rachna Singh
(74) *Attorney, Agent, or Firm*—Merchant & Gould P.C.; Ryan T. Grace

(57) ABSTRACT

A table version of a document is generated by computing a table layout of the document and generating the table version based on the table layout. Computing the table layout can include recording the positions of each object in the document while recording the position of text by recording the position of each line, dividing the document into sections, and grouping the sections based on their object content while compensating for overlapping objects. Generating the table version of the document from the table layout can include creating table code that represents information in the table layout of the document. The table version of the document can be used to export the document to one or more computers in a distributed network while maintaining the visual fidelity and text content of the original document.

20 Claims, 24 Drawing Sheets

OTHER PUBLICATIONS

"HTML for the World Wide Web;" Fourth Ed., Elizabeth Castro; Peachpit Press; 2000; pp. 143-157.*

"Essential Photoshop 6 for Web Professionals," Second Edition; Brad Eigen; Prentice Hall PTR, Aug. 20, 2001; Safari Tech Books Online; downloaded pages marked 1-22.*

"Bounding Rectangles; Microsoft Windows CE 3.0," Microsoft Corporation, copyright 1992-2000 (last updated May 18, 2004); downloaded from msdn.microsoft.com/library/en-us/wcegmm/html/; 1 page only.*

"Better Design with ImageReady Slices," Christian Nelson; Inside Photoshop, Apr. 2000, pp. 11-15.*

"Using Adobe Photoshop 7, Special Edition," Peter Bauer and Jeff Foster, Que Corporation, 2003; pp. 749-753.*

* cited by examiner

| | C1 | C2 | C3 | C4 | C5 | C6 | C7 |
|---|---|---|---|---|---|---|---|
| R1 | (1,1,P) | (1,1,P) | (1,1,P) | (1,1,N) | (1,1,N) | (1,1,N) | (1,1,N) |
| R2 | (1,1,P) | (1,1,P) | (1,1,P) | (1,1,T) | (1,1,T) | (1,1,N) | (1,1,N) |
| R3 | (1,1,P) | (1,1,P) | (1,1,P) | (1,1,P) | (1,1,P) | (1,1,N) | (1,1,N) |
| R4 | (1,1,N) | (1,1,N) | (1,1,T) | (1,1,T) | (1,1,N) | (1,1,N) | (1,1,N) |
| R5 | (1,1,N) | (1,1,N) | (1,1,N) | (1,1,N) | (1,1,N) | (1,1,N) | (1,1,N) |
| R6 | (1,1,N) | (1,1,T) | (1,1,N) | (1,1,T) | (1,1,T) | (1,1,T) | (1,1,N) |
| R7 | (1,1,N) | (1,1,N) | (1,1,N) | (1,1,N) | (1,1,N) | (1,1,N) | (1,1,N) |

LEGEND: (COLUMNS,ROWS,OBJECT)
T=TEXT; P=PICTURE, N=NO OBJECT

|  | C1 | C2 | C3 | C4 | C5 | C6 | C7 |
|---|---|---|---|---|---|---|---|
| R1 | (1,1,P) | (1,1,P) | (1,1,P) | (1,1,N) | (1,1,N) | (1,1,N) | (1,1,N) |
| R2 | (1,1,P) | (1,1,P) | (1,1,P) | (2,1,T) | (0,1,T) | (1,1,N) | (1,1,N) |
| R3 | (1,1,P) | (1,1,P) | (1,1,P) | (1,1,P) | (1,1,P) | (1,1,N) | (1,1,N) |
| R4 | (1,1,N) | (1,1,N) | (2,1,T) | (0,1,T) | (1,1,N) | (1,1,N) | (1,1,N) |
| R5 | (1,1,N) | (1,1,N) | (1,1,N) | (1,1,N) | (1,1,N) | (1,1,N) | (1,1,N) |
| R6 | (1,1,N) | (5,1,T) | (0,1,T) | (0,1,T) | (0,1,T) | (0,1,T) | (1,1,N) |
| R7 | (1,1,N) | (1,1,N) | (1,1,N) | (1,1,N) | (1,1,N) | (1,1,N) | (1,1,N) |

LEGEND: (COLUMNS,ROWS,OBJECT)
T=TEXT, P=PICTURE, N=NO OBJECT

|    | C1     | C2     | C3     | C4     | C5     | C6     | C7     |
|----|--------|--------|--------|--------|--------|--------|--------|
| R1 | (7,1,P)| (0,1,P)| (0,1,P)| (0,1,N)| (0,1,N)| (0,1,N)| (0,1,N)|
| R2 | (3,2,P)| (0,2,P)| (0,2,P)| (2,1,T)| (0,1,T)| (2,4,N)| (0,4,N)|
| R3 | (3,0,P)| (0,0,P)| (0,0,P)| (2,1,P)| (0,1,P)| (2,0,N)| (0,0,N)|
| R4 | (2,2,N)| (0,2,N)| (2,1,T)| (0,1,T)| (1,2,N)| (2,0,N)| (0,0,N)|
| R5 | (2,0,N)| (0,0,N)| (2,1,N)| (0,1,N)| (1,0,N)| (2,0,N)| (0,0,N)|
| R6 | (1,2,N)| (5,1,T)| (0,1,T)| (0,1,T)| (0,1,T)| (0,1,T)| (1,2,N)|
| R7 | (1,0,N)| (5,1,N)| (0,1,N)| (0,1,N)| (0,1,N)| (0,1,N)| (1,0,N)|

LEGEND: (COLUMNS,ROWS,OBJECT)
T=TEXT, P=PICTURE, N=NO OBJECT

*Fig. 26*

|    | C1 | C2 | C3 | C4 | C5 | C6 | C7 |
|----|----|----|----|----|----|----|----|
| R1 | (6,1,P) | (0,1,P) | (0,1,P) | (0,1,N) | (0,1,N) | (0,1,N) | (0,0,N) |
| R2 | (3,2,P) | (0,2,P) | (0,2,P) | (2,1,T) | (0,1,T) | (1,4,N) | (0,0,N) |
| R3 | (3,0,P) | (0,0,P) | (0,0,P) | (2,1,P) | (0,1,P) | (1,0,N) | (0,0,N) |
| R4 | (2,2,N) | (0,2,N) | (2,1,T) | (0,1,T) | (1,2,N) | (1,0,N) | (0,0,N) |
| R5 | (2,0,N) | (0,0,N) | (2,1,N) | (0,1,N) | (1,0,N) | (1,0,N) | (0,0,N) |
| R6 | (1,1,N) | (5,1,T) | (0,1,T) | (0,1,T) | (0,1,T) | (0,1,T) | (0,0,N) |
| R7 | (0,0,N) | (0,0,N) | (0,0,N) | (0,0,N) | (0,0,N) | (0,0,N) | (0,0,N) |

2700

LEGEND: (COLUMNS,ROWS,OBJECT)
T=TEXT, P=PICTURE, N=NO OBJECT

*Fig. 27*

```
1  <TABLE>
2    <TR>
3      <TD colspan = 6, rowspan = 1>
4        <img src="image1.jpg">
5      </TD>
6    </TR>
7    <TR>
8      <TD colspan = 3, rowspan = 2>
9        <img src="image2.jpg">
10     </TD>
11   </TR>
12   <TR>
13     <TD colspan = 2, rowspan = 1>
14       This <b>is</b> formatted <i>text</i>
15     </TD>
16   </TR>
17 </TABLE>
```

*Fig. 28*

METHOD AND SYSTEM FOR CREATING A TABLE VERSION OF A DOCUMENT

BACKGROUND

The capability to export documents, such as text, image, or desktop publishing documents, to one or more computers in a distributed computer network, such as a local area network (LAN), wide area network (WAN), or the Internet, is an important function for communicating information. For example, a user can transmit a document over a distributed computer network using a document program, such as a word processing, graphics drawing, or desktop publishing program, to be accessed by another user as a document, using a document program, or as part of an e-mail message, using an Internet e-mail client.

Typically, both the sender and the user of a document that has been exported over a distributed computer network want the exported document to look the same as the original document looks when viewed using the document program that created the document, whether the exported document is viewed using a document program, Internet client, or some other application program. Additionally, the user of a document that has been exported over a distributed network often needs the ability to select text in the exported document to, for example, perform editing functions, such as copying or modifying the text, and the ability to perform search functions to, for example, locate pertinent portions of the text. Additionally, indiscriminately exporting text as image files results in a much larger file size for the document. Sometimes this may result in a file size that is too larger for certain e-mail systems.

However, existing approaches for creating an export version of a document, such as the use of cascading style sheet (CSS) positioning or vector markup language (VML), have shortcomings in providing the needs described above to a user. For example, existing approaches do not consistently provide an exported document that looks the same as the original document. Typically, the relative two-dimensional positioning of objects in the original document, such as text or images, is changed or removed in the exported document, as a result of the use of existing approaches to create the export version of the document. This may cause the objects to appear bunched together in line in the exported document. In some cases, separate objects in the original document may appear partially or completely overlapping each other in the exported document, due to the approach used to create the export version of the document. This and other inconsistent appearance problems occur even with the use of CSS positioning or VML, since many application programs automatically remove such formatting from an exported document when it is accessed in order to preserve a consistent and secure user interface. Often it is the viewer application, such as an online e-mail application, that removes the formatting from the exported document. Since the formatting is not controlled by the exporting application, but rather the viewing application, the consistency of the document format can't be relied on.

As another example, existing approaches for creating an export version of a document typically convert all text in the original document to one or more images in the export version of the document. As a result of such conversions, the text in the exported document typically cannot be selected to perform editing functions. Furthermore, search functions of an application program used to access the exported document typically cannot be performed on the text after such conversions. Additionally, other text-related functions that an application program may provide are typically may also be unusable on the converted text.

In view of the foregoing, there is a need in the art generating electronic documents in a manner that allows exported documents to consistently look the same as the original documents. A further need exists to generate electronic documents for export, where the exported documents comprise the text of the original document and support the operations of selecting and editing the text, performing search functions on the text, and performing other text-related functions that may be provided by an application program used to access exported documents.

SUMMARY

The present invention is directed to the creation of a table version of a document, which is typically a representation of the document that includes a layout based on a table. This table version of the document can be used to export the document to one or more computers in a distributed computer network while maintaining the visual fidelity (e.g., appearance) and text content of the original document. The present invention overcomes the shortcomings of existing approaches for creating an export version of a document, which typically cause exported documents to look and perform different from the original documents. For example, existing approaches typically cause the positions of text or images in the original document to change in the exported document. Additionally, existing approaches typically convert text to a different format (e.g., bitmapped), thereby preventing the text from being selected and edited, searched using a search function, or manipulated by other text-related functions that may be provided by an application program used to access exported documents. The present invention separates the text from the other objects of the document when possible so that the text is not bitmapped and can be manipulated by a user after the document is transferred.

In a typical aspect of the present invention, a table version of a document is created by, first, recording the position of each object in a document. An object descriptor builder routine of a document program, or other program module, can perform this recording of the object positions. The position of each object is recorded, for example, to provide reference position information to create a table layout of the document. In accordance with one aspect of the present invention, the position of text corresponds to the position of the actual text rather than the position defined by the edges of the text object. Both the position of the text and the position of the text object may be recorded and exported separately. This allows objects to be separated into smaller units (e.g., primitives) than just separating the document at the object level. After recording the positions of the objects in the document, the document can be divided into sections or cells. A cell descriptor builder routine can accomplish this dividing of the document into sections. One purpose of dividing the document into sections is to organize the document for subsequent processing to create the table layout of the document.

After the document is divided into sections, groups of two or more sections that contain a part of the same text object in the document are merged (or grouped) together with certain exceptions as described herein. This merging of the sections can be performed by a text cell merger routine. By merging the sections that contain parts of the same text object, the format of the text can be maintained when the document is exported as a table version. As a result, the text maintains its appearance and its functionality when it is exported in a document. For example, the text will typically maintain its size and position as a result of merging the sections that contain parts of the same text object. As a another example, the text can typically be selected and edited, searched using a search function, and manipulated by other text related functions of an application program as a result of merging the sections.

After merging groups of two or more sections that contain a part of the same text object in the document, groups of two or more remaining sections of the document, that were not previously merged, are now merged or grouped. For example, if the document includes two or more sections that contain part of a non-text object, such as a picture object, these sections can be merged. A remaining cell merger software routine can perform the merging of the remaining sections of the document. One purpose of merging the remaining, unmerged sections of the document is to reduce the amount of information about the document, such as text or a picture, that needs to be transferred separately when the document is exported as a table version.

The table layout can be used to generate a table version of the document based on the merged sections that are represented in the table layout. For example, the table layout can provide descriptors that indicate which sections in the document are merged and the object contents of these merged sections. This descriptor information can be used by a table computer routine to generate table code that represents the table version of the document. When this table version of the document is exported, for example from one computer to another in a distributed network, the exported document will typically have the same appearance and text format as the original document. Furthermore, text is not bitmapped along with the images, possibly reducing the size of the exported document.

In accordance with one aspect of the invention, the position of a text object is determined by first determining the position of each line of text within the text object. Each line of text within the text object is then merged together to determine the positioning of the text object. Determining the position of the text object using this method reduces the overall size of the text object. As a result, an object that was overlapping the original text object without actually overlapping the text may no longer be considered overlapping due to the per line positioning determination. Determining positioning of text by first determining the positioning of each line provides other advantages described in the following disclosure.

In accordance with another aspect of the present invention, each cell in the table layout has associated properties. For example, a background color may be associated with a cell instead of classifying the cell as a picture due to a colored field in the cell. This allows the cell to be treated as text rather than being bitmapped as a picture or other object. In another example, the background property is an image. Associating the image as a property of the cell allows the image to be bitmapped separately from the text reducing the size of the bitmap for the image and preventing the text from being bitmapped. Another property that may be associated with the cell is a hyperlink, again avoiding the need to bitmap the text corresponding to the link.

In accordance with still another aspect of the present invention, an overlapping object may be place over (in the z coordinate) a text object with a "wrapping" setting activated. "Wrapping" refers to a setting that realigns the text within the text object to show the complete text despite the overlapping object. Since the present invention determines the text position based on the location of the text rather than the text object, the overlapping object may be bitmapped separately from the text.

In accordance with yet another aspect of the present invention, a graphical table may contain cells that include text. Some cells may have graphical elements, such as diagonal lines or similar. The present invention bitmaps the cells with graphical elements but maintains the other cells individually as text objects. This provides an exception for merging cells of similar types and keeps the cells separate so that more of the table is treated as text rather than bitmapped. Columns of the text are also treated as separate text objects split by the graphical line rather than as a picture object due to the graphical line.

In accordance with still another aspect of the present invention, sections of text including inline objects, or graphical objects inserted in character positions within the text, is classified as separate text and graphical objects rather than then as a composite picture.

These and other aspects of the invention will be described further in the detailed description below in connection with the drawing set and claim set.

BRIEF DESCRIPTION OF THE DRAWINGS

FIG. 23 illustrates an alternate exemplary document comprising a merger of remaining cells that do not contain text objects, as constructed in accordance with an exemplary process illustrated by the logic flow diagram of FIG. 10.

FIG. 24 illustrates an exemplary table of cell descriptors in accordance with the exemplary document illustrated in FIG. 20.

FIG. 26 illustrates an exemplary table of cell descriptors in accordance with the exemplary document illustrated in FIG. 22.

FIG. 27 illustrates an exemplary table of cell descriptors in accordance with the exemplary document illustrated in FIG. 23.

FIG. 28 is an exemplary listing of an excerpt of hyper-text markup language (HTML) table layout code representing several merged cells illustrated in the exemplary document of FIG. 23.

DETAILED DESCRIPTION

Figure 1:
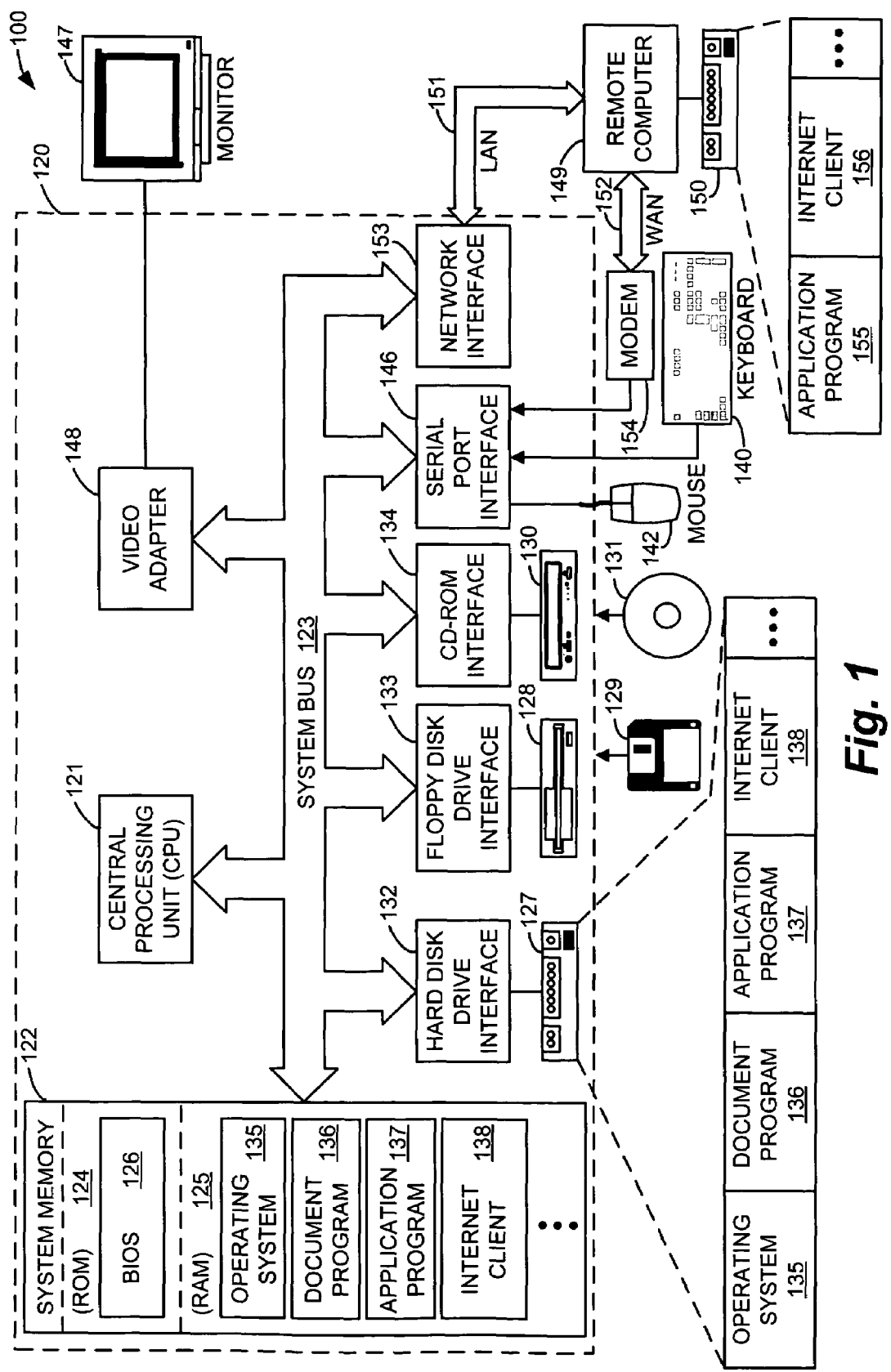
FIG. 1 is a block diagram illustrating an exemplary operating environment for implementation of various embodiments of the present invention.

The present invention enables the creation of a table version of a document, which is typically a representation of the document that includes a layout based on a table. This table version of the document can be used to export the document to one or more computers in a distributed computer network while maintaining the visual fidelity (e.g., appearance) and text content of the original document. More specifically, an exemplary embodiment of the present invention computes a table layout of a document and generates a table version of the document based on the computed table layout. The table version of the document can be exported over a distributed computer network to provide an accurate reproduction of the original document. Conventional approaches typically use cascading style sheet (CSS) positioning, vector markup language (VML), or a similar technique to create an export version of a document. As a result, documents exported using the conventional approaches to creating an export version of a document typically look different from the original documents, for example, due to changes in the positions of text and images in the document. In contrast, through the use of table layouts, the present invention provides exported documents that have the same appearance as the original documents. Conventional approaches also typically convert text from the original documents into images in the exported documents (bitmapping). In contrast, the present invention enables the text from original documents to be maintained as text in the exported documents, thereby allowing the text in the exported documents to be selected and edited, searched using a search function, or manipulated by other text-related functions that may be provided by an application program used to access exported documents.

Although exemplary embodiments of the present invention will be generally described in the context of a software module and an operating system running on a personal computer, those skilled in the art will recognize that the present invention can also be implemented in conjunction with other program modules for other types of computer system configurations, including hand-held devices, multi-processor systems, microprocessor based or programmable consumer electronics, network person computers, minicomputers, mainframe computers, and the like. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including processing units, memory storage devices, display devices, and/or input devices. These processes and operations may utilize conventional computer components in a distributed computing environment, including remote file servers, remote computer servers, and remote memory storage devices. Each of these conventional distributed computing components is accessible by a processing unit via a communications network.

The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention includes a computer program which embodies the functions described herein and illustrated in the appended logic flow diagrams (or flow charts). However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the present invention. The inventive functionality of the computer program will be explained in more detail in the following description in conjunction with the remaining figures illustrating the program flow.

Referring now to the drawings, in which like numerals represent like elements throughout the several figures, aspects of the present invention and an exemplary operating environment for the implementation of the present invention will be described.

FIG. 1 illustrates a representative operating environment 100 for implementation of an exemplary embodiment of the present invention. The exemplary operating environment 100 includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures, including a memory bus or memory controller, a peripheral bus, or a local bus, using any of a variety of bus architectures. The system memory 122 includes a read-only memory (ROM) 124 and a random access memory (RAM) 125. A basic input/output system (BIOS) 126, containing the basic routines that help to transfer information between elements within the personal computer 120, such as during start-up, is stored in the ROM 124.

The personal computer 120 further includes a hard disk drive 127 for reading from and writing to a hard disk (not shown), a magnetic disk drive 128 for reading from or writing to a removable magnetic disk 129 such as a floppy disk, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical disk drive interface 134, respectively. Although the exemplary operating environment 100 employs a ROM 124, a RAM 125, a hard disk drive 127, a removable magnetic disk 129, and a removable optical disk 131, it should be appreciated by those skilled in the art that other types of computer readable media which can store data that is accessible by a computer may also be used in the exemplary operating environment 100, such as magnetic cassettes, flash memory cards, digital video disks, Bernoulli cartridges, and the like. The drives and their associated computer readable media can provide nonvolatile storage of computer-executable instructions, data structures, program modules, and other data for the personal computer 120.

A number of program modules may be stored on the ROM 124, RAM 125, hard disk drive 127, magnetic disk 129, or optical disk 131, including an operating system 135 and various application programs 136-138. Program modules include routines, sub-routines, programs, objects, components, data structures, etc., which perform particular tasks or implement particular abstract data types. In accordance with an exemplary embodiment of the present invention, the application programs 136-138 may include a document program 136, such as a word processing, graphics drawing, or desktop publishing program. The other application programs 137-138 may include another application program 137, such as a word processing, spreadsheet, or database program, and an Internet client 138, such as an e-mail or web browsing program. Exemplary embodiments of the present invention will be described below with respect to the document program 136 and the other application programs 137-138.

A user may enter commands and information to the personal computer 120 through input devices, such as a keyboard 140 and a pointing device 142. The pointing device 142 may include a mouse, a trackball, or an electronic pen that can be used in conjunction with an electronic tablet. Other input devices (not shown) may include a microphone, joystick, game pad, satellite dish, scanner, or the like. These and other input devices are often connected to the processing unit 122 through a serial port interface 146 that is coupled to the system bus 123, but may be connected by other interfaces, such as a parallel port, game port, a universal serial bus (USB), or the like. A display device 147, such as a monitor, may also be connected to system bus 123 via an interface, such as a video adapter 148. In addition to the display device 147, the personal computer 120 may include other peripheral output devices (not shown), such as speakers and a printer.

The personal computer 120 may operate in a networked environment using logical connections to one or more remote computers 149. The remote computer 149 may be another personal computer, a server, a client, a router, a network PC, a peer device, or other common network node. While the remote computer 149 typically includes many or all of the elements described above relative to the personal computer 120, only a memory storage device 150 has been illustrated in FIG. 1 for simplicity. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may also be stored in the remote memory storage device 150. For example, the remote memory storage device 150 includes an e-mail client. 155 and an Internet web browsing client 156. It will be appreciated that the network connections shown are exemplary and other means of establishing a communications link between the computers may be used.

Figure 2:
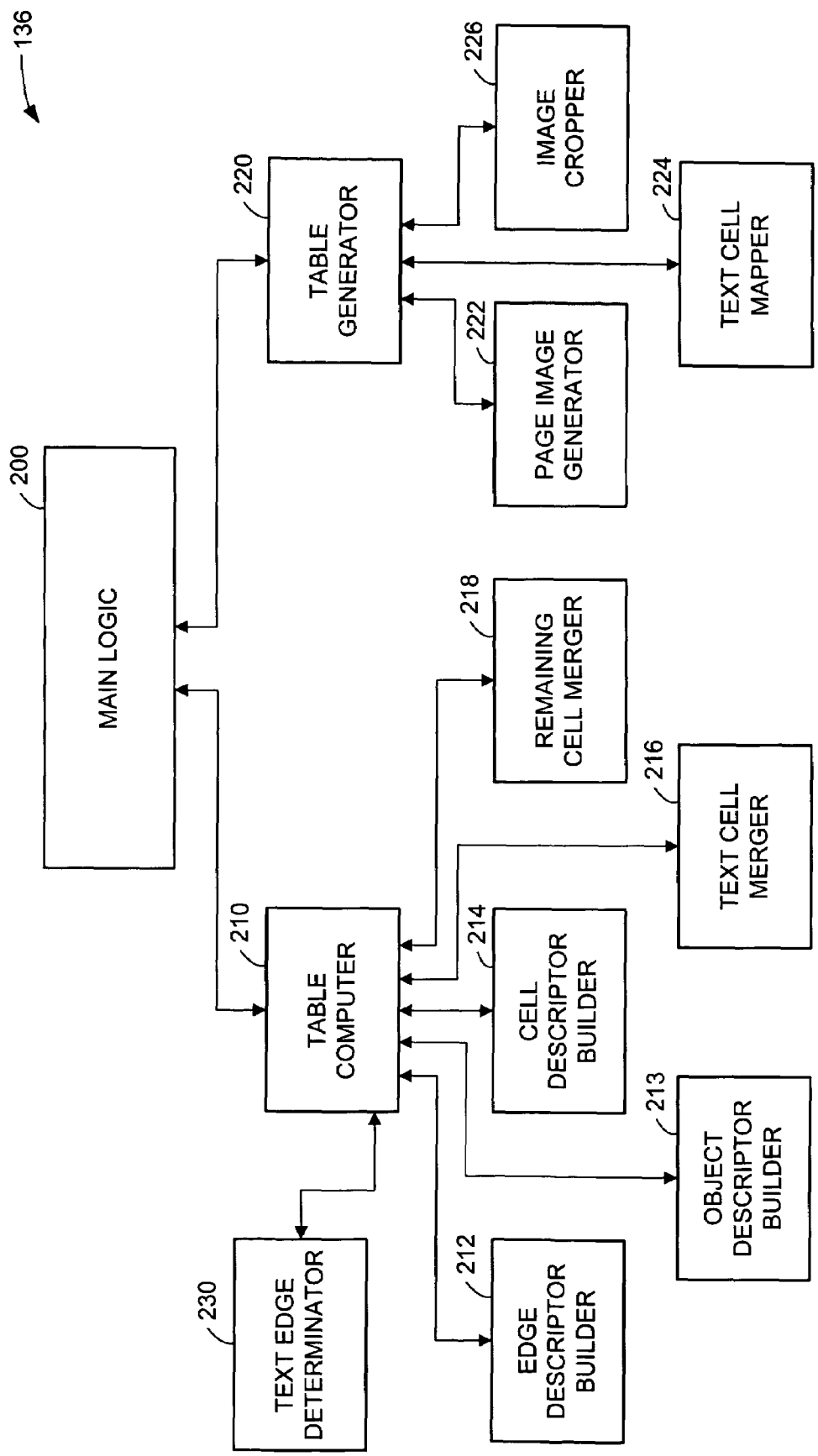
FIG. 2 is a block diagram illustrating a component architecture for a document program constructed in accordance with an exemplary embodiment of the present invention.

Referring now to FIG. 2, a block diagram is shown that illustrates representative component architecture of a document program constructed in accordance with an exemplary embodiment of the present invention. The exemplary document program architecture 136 includes a main logic 200, which embodies main routines and functions of the document program 136. In addition to the main logic 200, the exemplary document program architecture 136 includes several application modules, routines, or program blocks. In this regard, the exemplary architecture 136 also includes a table computer 210, which is typically in communications with the main logic 200. As depicted in FIG. 2, several modules are typically in communications with the table computer 210. These modules include an edge descriptor builder 212, an object descriptor builder 213, a cell descriptor builder 214, a text cell merger 216, a remaining cell merger 218, and a text edge determinator 230. A table generator 220 is also typically in communications with the main logic 200 in the exemplary architecture 136. A page image generator 222, a text cell mapper 224 and an image cropper 226 are typically in communications with the table generator 220. Various functions of these blocks that are in communications with the main logic 200 will be described below as they relate to aspects of the present invention.

Figure 3:
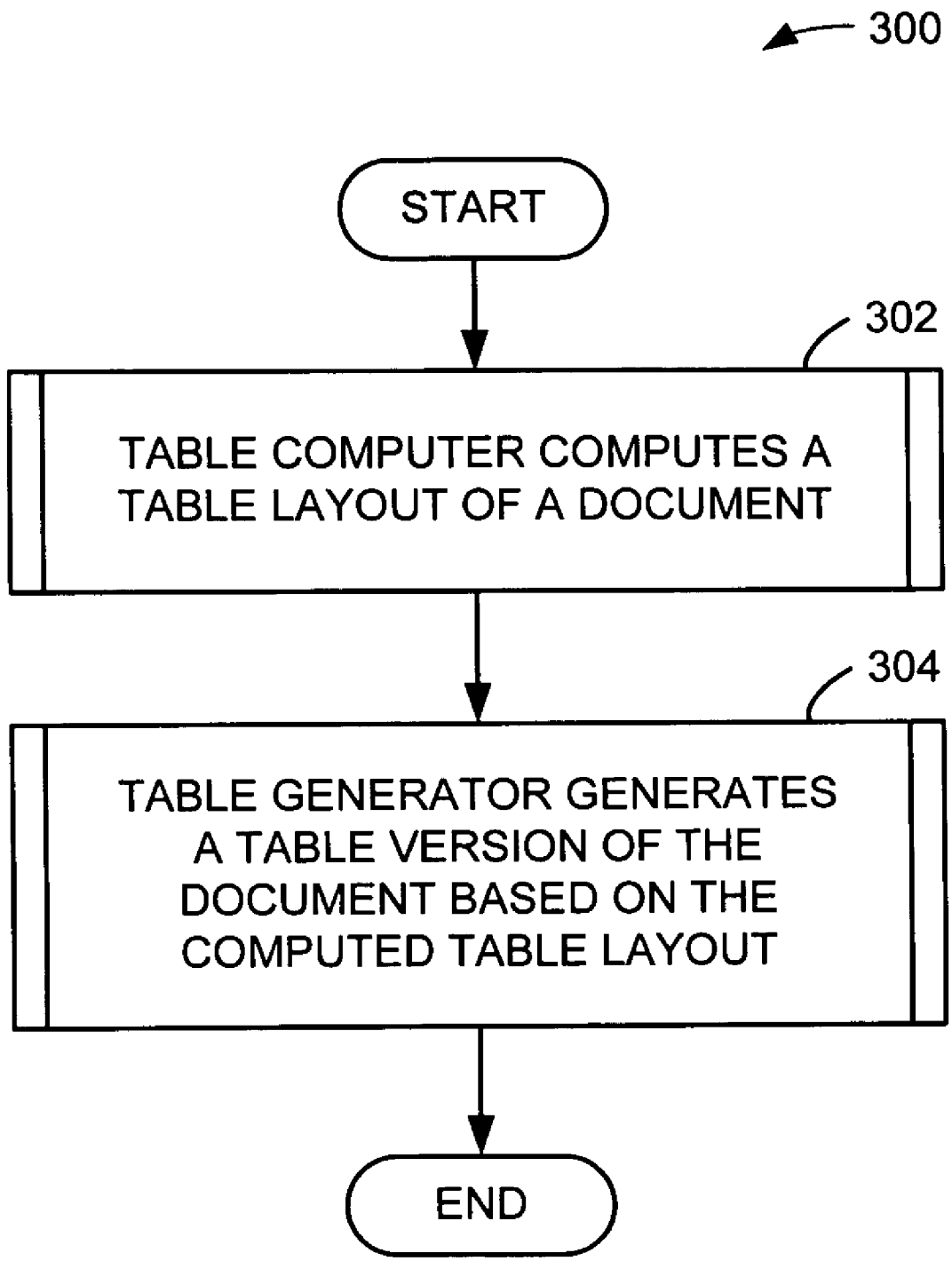
FIG. 3 is a logic flow diagram illustrating an overview of process for creating a table version of a document according to an exemplary embodiment of the present invention.

In the following discussion, references will be made to elements of the document program 136 including the table computer 210 and its submodules 212-218 and 230, the table generator 220 and its submodules 222-226, and the exemplary operating environment 100, as applicable to facilitate the description of aspects and embodiments of the present invention. In that regard, reference is now made to FIG. 3, which is a logic flow diagram that illustrates an overview of an exemplary process 300 for creating a table version of a document according to an exemplary embodiment of the present invention. In the step 302 of the exemplary process 300, the table computer 210 computes a table layout of a document. This step of computing the table layout can include several substeps, some of which will be described below in connection with FIG. 4. In the next step 304, the table generator 220 generates a table version of the document that is based on the computer table layout that was computed in the previous step 302. The generation of a table version of the document in step 304 can include several substeps, some of which will be described in more detail below in connection with FIG. 11. The table version of the document generated in step 304 can be exported to one or more computers over a distributed computer network. An application program, such as a document program or an Internet client, executed by the one or more computers can be used to generate an accurate reproduction of the original document from the exported table version of the document. The reproduction of the exported document, based on the table version of the original document, will include text and images that are the same and in the same positions as in the original document.

Figure 4:
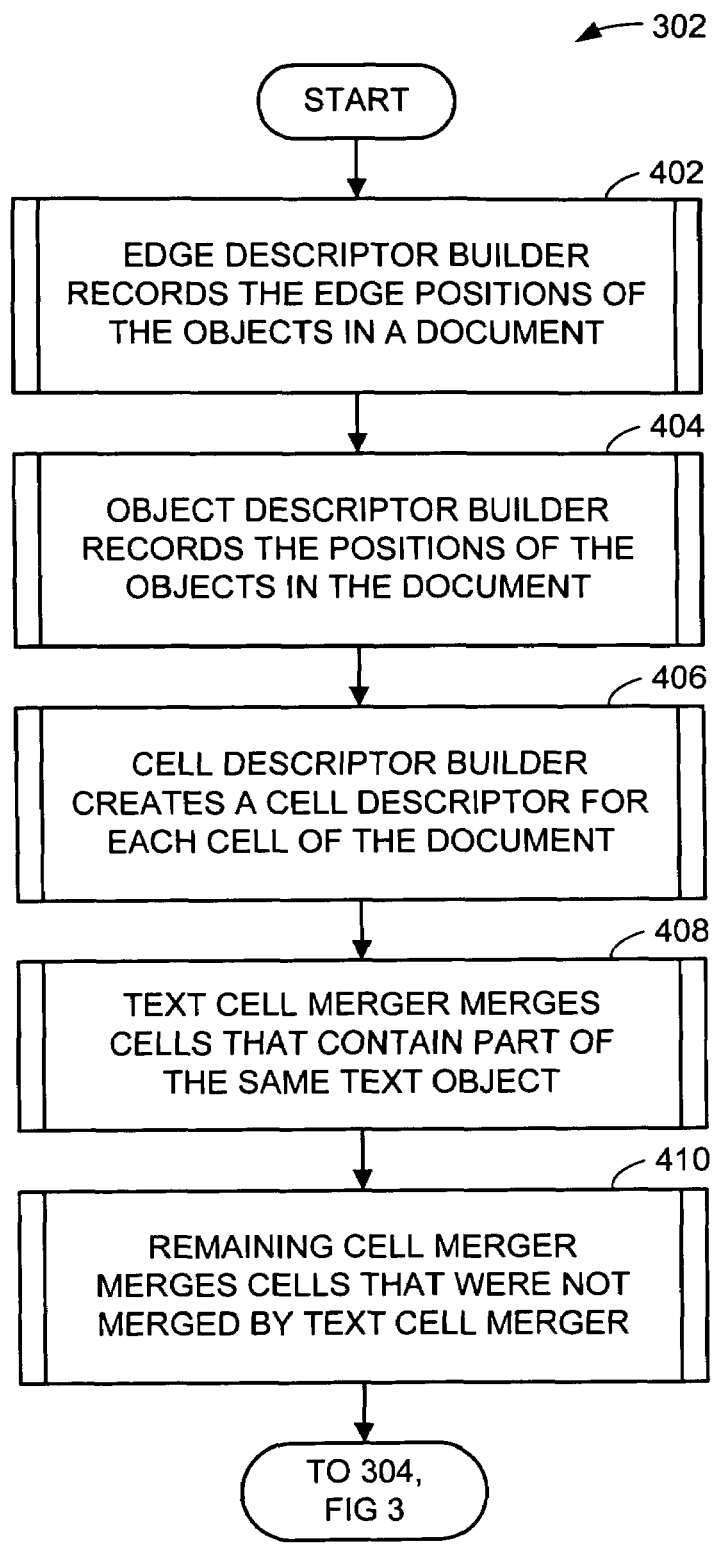
FIG. 4 is a logic flow diagram illustrating a process for computing a table layout of a document according to an exemplary embodiment of the present invention.
Figure 19:
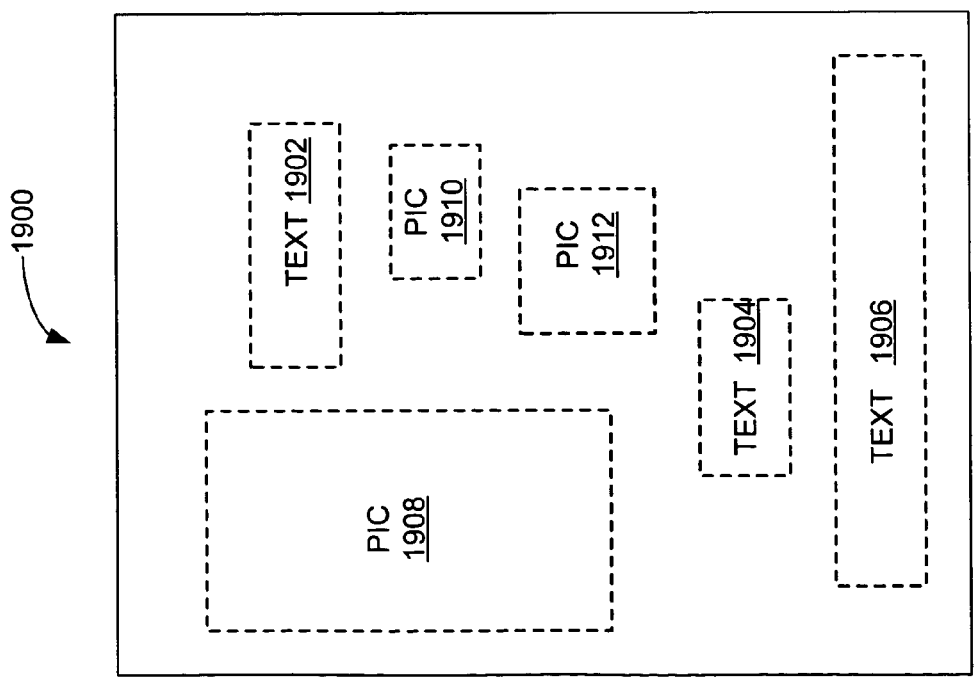
FIG. 19 illustrates an exemplary document that includes text objects and picture objects according to an exemplary embodiment of the present invention.

Turning now to FIG. 4, a logic flow diagram is shown that illustrates an exemplary process 302 for computing a table layout of a document. The exemplary process 302 begins with step 402 in which the edge descriptor builder 212 records the edge positions of the objects in a document. Turning briefly to FIG. 19, an exemplary document 1900 is shown that includes text objects 1902-1906 and picture objects 1908-1912. These are examples of objects whose edge positions would be recorded by edge descriptor builder 212 in step 402 of the exemplary process 302 illustrated in FIG. 4. The step 402 of recording the edge positions of the objects in a document may include several substeps, some of which will be described further below in connection with FIG. 5. After step 402, in step 404 the object descriptor builder 213 records the positions of the objects in the document. In contrast to step 402, in step 404, the overall positions of the objects are recorded, not just the positions of the edges of the objects. The step of recording the positions of the objects may also include several substeps, which will be described further below.

The object edge positions and the object positions in the document may be based on various references. For example, this position information may be represented based on a variety of coordinate systems, which typically include a "unit" and an "origin." For a document, a common unit is pixels and a common origin is the top-left corner of the document, however, other units and origins can also be used for the invention. Furthermore, the position information may be described by one or more coordinates with respect to the document, for example "x1"/"y1", "x2"/"y2". Other coordinate systems may be used to represent the position information within the scope of the invention as well.

Following step 404 is step 406 in which the cell descriptor builder 214 creates a cell descriptor for each cell of the document. This step 406 may include several substeps, some of which will be described below. Referring briefly to FIG. 24, an exemplary table 2400 of cell descriptors is shown. As indicated by the legend in FIG. 24, the cell descriptor information may indicate the number of columns, the number of rows, and the type of object that correspond to the cell that is represented by the cell descriptor. Cell descriptors will be discussed further in reference to FIG. 24 and other figures below.

Figure 21:
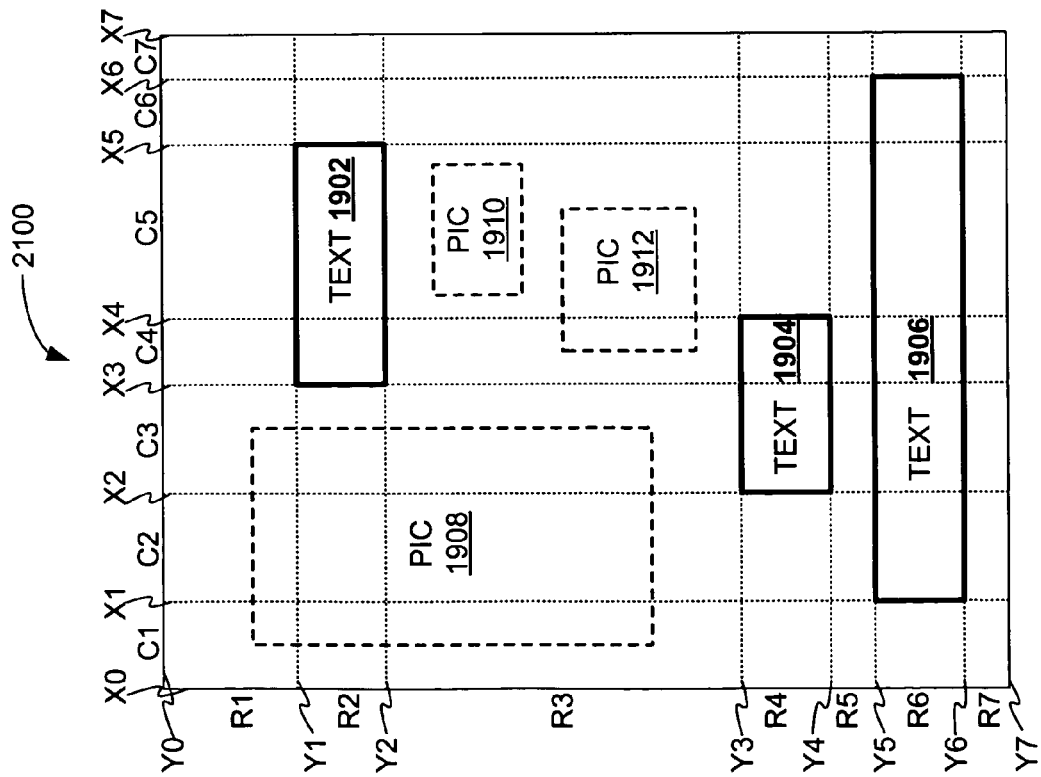
FIG. 21 illustrates an exemplary document with merged cells containing part of the same text object, as constructed in accordance with an exemplary process illustrated by the logic flow diagram of FIG. 9.

After step 406, in step 408, the text cell merger 216 merges (or groups) cells that contain part of the same text object with certain exceptions as described below. Turning briefly to FIG. 21, an exemplary document 2100 is shown in which the cells are merged that contain text objects 1902-1906 respectively. The merging of the cells by the text cell merger in step 408 may include several substeps, some of which will be discussed further below. After step 408, in step 410 of the exemplary process 302, the remaining cell merger 218 merges (or groups) remaining cells in the document that were not merged by the text cell mapper 216 in step 408. Briefly referring to FIG. 22, an exemplary document 2200 is shown in which remaining cells are merged to form merged cells 2202-2220, in addition to the merged text cells 1902-1906, which were described with respect to step 408. Following step 410, the exemplary process 302 proceeds to step 304 in FIG. 3.

Figure 5:
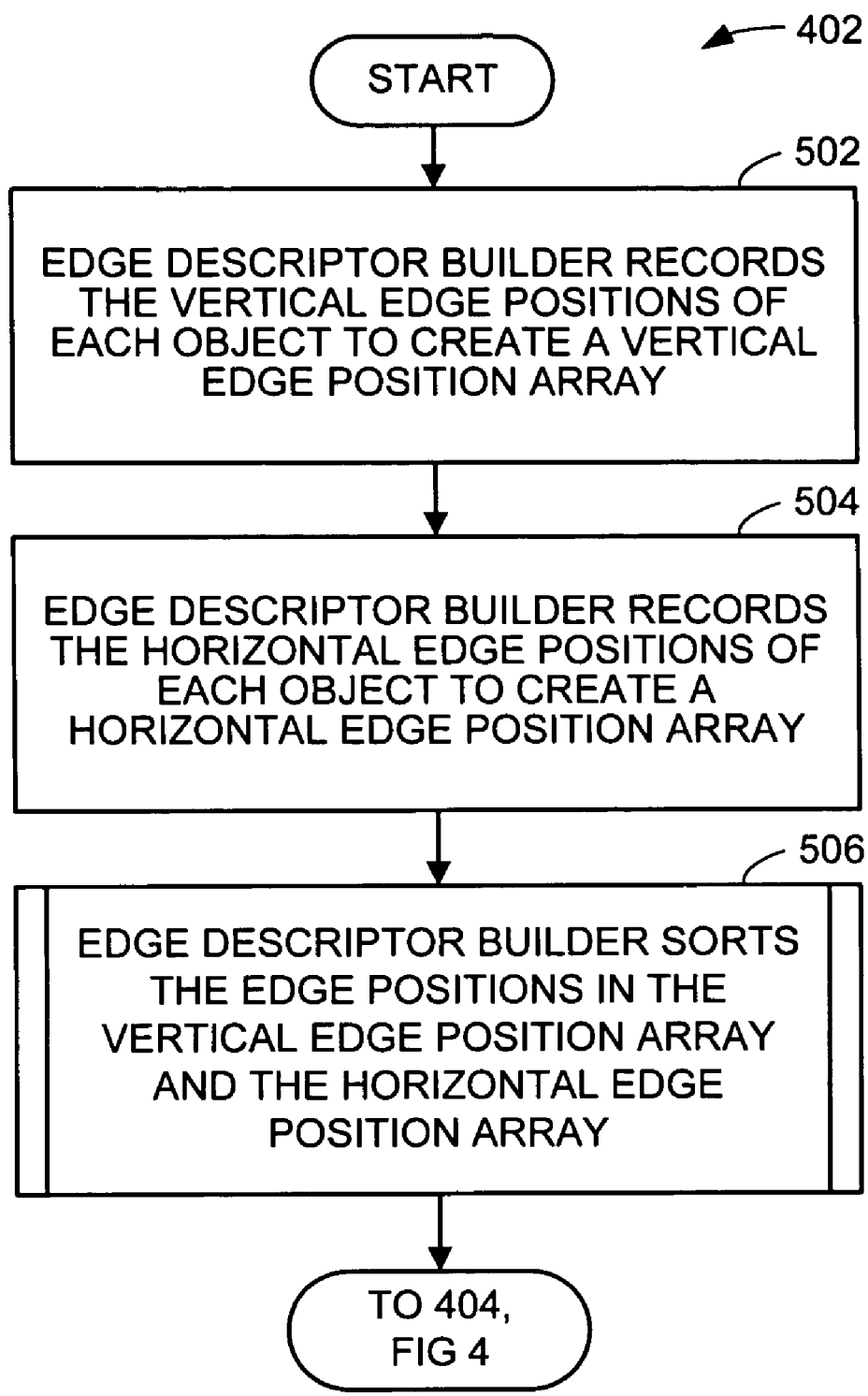
FIG. 5 is a logic flow diagram illustrating a process for recording the edge positions of the document according to an exemplary embodiment of the present invention.

Referring now to FIG. 5, a logic flow diagram is shown that illustrates an exemplary process 402 for recording the edge positions of the objects in a document. In this regard, the exemplary process 402 begins with step 502 in which the edge descriptor builder 212 records the vertical edge positions of each object in a document. Referring again briefly to the exemplary document 1900 in FIG. 19, the edge descriptor builder 212 may record the information of the left and right edges of the text object boxes 1902-1906 and/or the picture object boxes 1908-1912 that are depicted in FIG. 19. As discussed above, the position information may be recorded based on the pixel layout of the document 1900. Additionally, the position information that is recorded to the vertical position array may be based on two or more points along the vertical edges of the objects. The edge descriptor builder 212 records the vertical edge positions of the objects to a vertical edge position array, which may be stored in a memory such as the hard disk drive 127 or the system memory 122 discussed above for FIG. 1. In another embodiment, the edges for a text object are not recorded from the edge of the object but rather the merged result of the edges for each line of text. Recording the edge positions from a merger of the line edges reduces the text area and allows the positioning to be based on the position of the actual text rather than the position of the text object. An exemplary process for recording the merged line edges is provided below with reference to FIG. 29 and FIG. 30.

Following step 502, in step 504 the edge descriptor builder 212 records the horizontal edge positions of each object in the document. Similar to step 502, the edge descriptor builder 212 records the horizontal edge position of the objects to a horizontal edge position array, which may be stored in a memory as well. In one embodiment, the steps for sorting and removing duplicates is handled this step of the process rather than through merger of cells as described in FIG. 4. Added edge positions are compared with edge positions of the objects already included in the sorted array and are added at the position that maintains the sort of the array. The duplicates are not added at all. An inline comparison between the edges of a new object and the existing objects is performed using a quick sort (e.g., binary search) and therefore avoids the merger process. After step 504, the edge descriptor builder 212 sorts the edge positions that are stored in the vertical edge position array and the horizontal edge position array in step 506. This step 506 of sorting the edge positions may include several substeps, some of which will be described below in connection with FIG. 6. After step 506, the exemplary process 402 proceeds to step 404 of FIG. 4.

Figure 6:
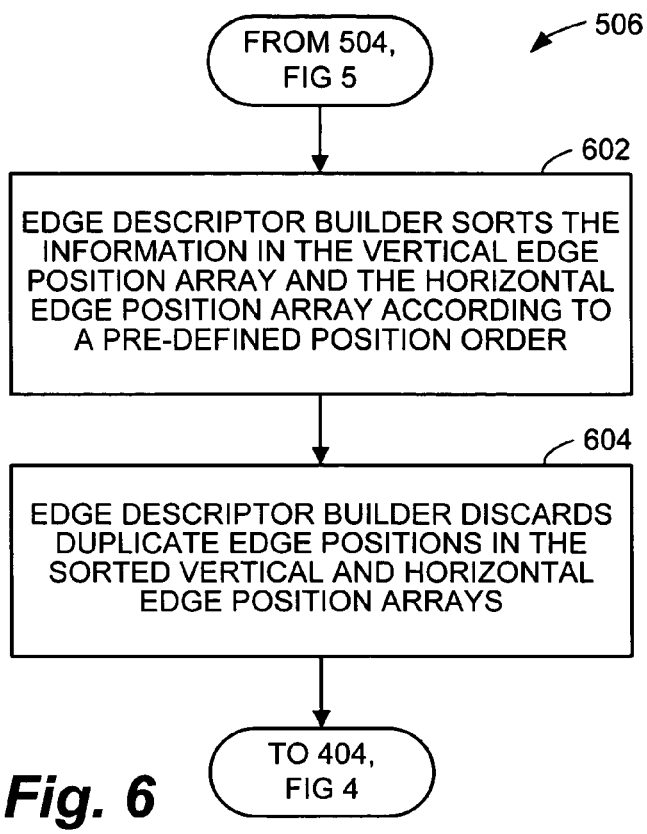
FIG. 6 is a logic flow diagram illustrating a process for sorting the edge position information in a vertical edge position array and a horizontal edge position array according to an exemplary embodiment of the present invention.

FIG. 6 is a logic flow diagram illustrating an exemplary process 506 for sorting the edge positions in the vertical and horizontal edge position arrays. The exemplary process 506 begins with step 602 in which the edge descriptor builder 212 sorts the edge position information in the vertical and horizontal edge position arrays according to a predefined position order. For example, the edge descriptor builder 212 may sort the edge position information in the arrays in a numerical order or in a left to right, top to bottom entry position order.

In step 604 of the exemplary process 506, the edge descriptor builder 212 discards any duplicate edge positions that exist in the vertical and horizontal edge position arrays after they are sorted in step 602. Duplicate edge positions may occur in the sorted edge position arrays, for example, if there are two or more objects that have at least a portion of their edges located at common points on the document. The exemplary process 506 proceeds from step 604 to step 404 of FIG. 4.

Figure 7:
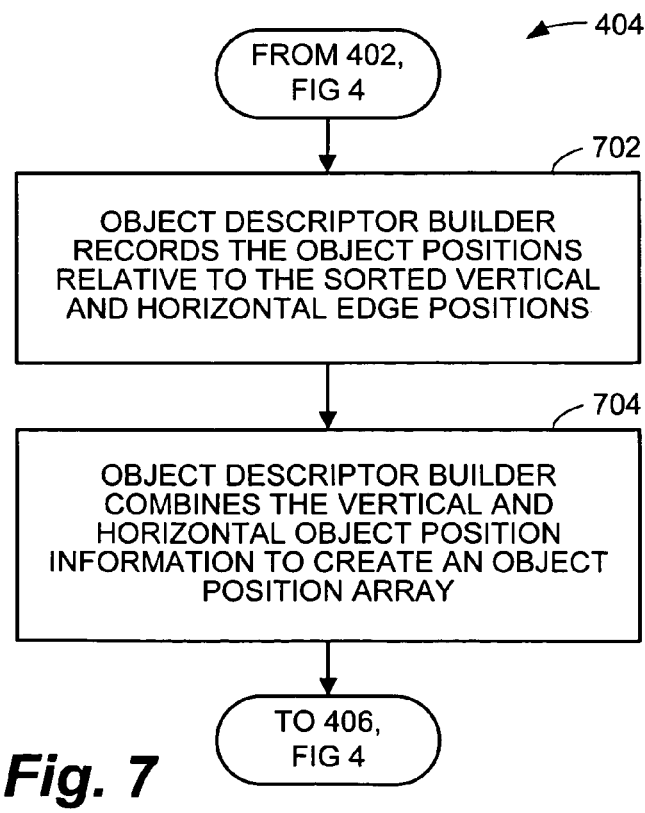
FIG. 7 is a logic flow diagram illustrating a process for recording the positions of objects in a document according to an exemplary embodiment of the present invention.

Turning now to FIG. 7, a logic flow diagram is shown that illustrates an exemplary process 404 for recording the positions of the objects in a document. The exemplary process 404 begins with step 702 in which the object descriptor builder 213 records the positions of the objects in the document. The object descriptor builder 213 records the positions of the objects relative to the sorted vertical and horizontal edge position information described above with respect to FIG. 5. For example, referring briefly to FIG. 20, the object descriptor builder 213 may record the position of the text object 1902 as extending from a third vertical edge position X3 to a fifth vertical edge position X5 and from a first horizontal edge position Y1 to a second horizontal edge position Y2. As discussed above, the edge positions may be based on pixel coordinates of the document or some other reference.

Following step 702, in step 704, the object descriptor builder 704 combines the object position information recorded in step 702, which is based on the sorted vertical and horizontal edge position information. The object descriptor builder 213 records this combined object position information to an object position array, which may be stored in a memory such as the hard disk drive 127 or the system memory 122 discussed above for FIG. 1.

Figure 8:
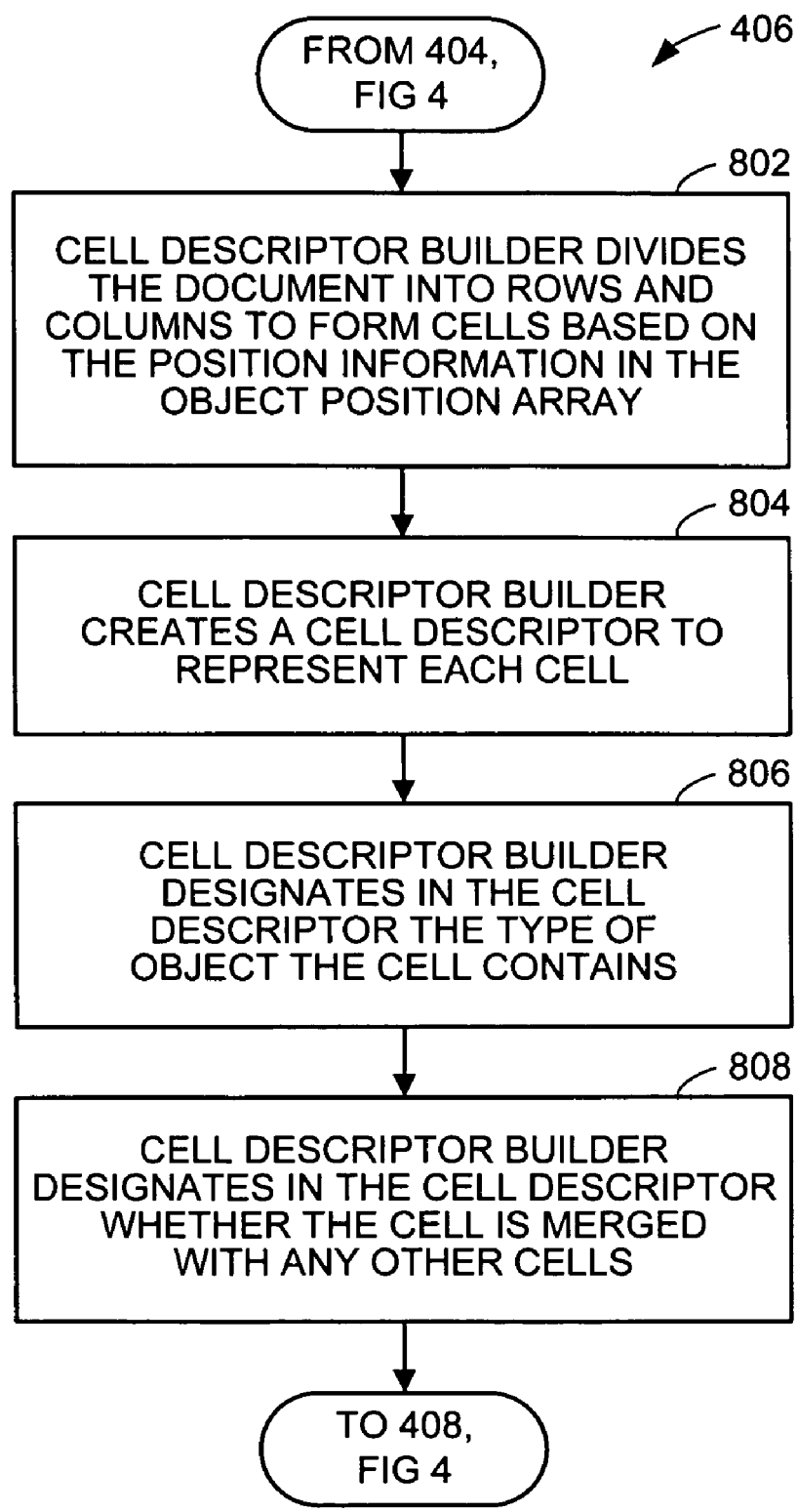
FIG. 8 is a logic flow diagram illustrating a process for creating a cell descriptor for each cell of a document in accordance with an exemplary embodiment of the present invention.
Figure 20:
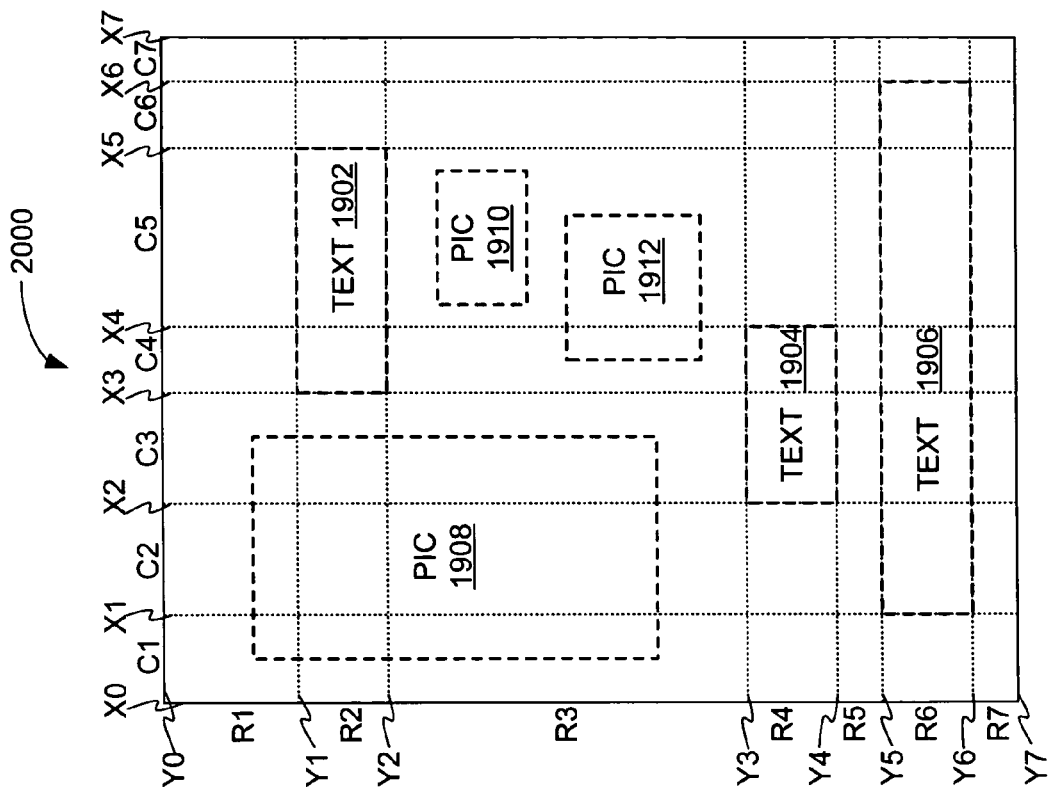
FIG. 20 illustrates an exemplary document that is divided into rows and columns to form cells that correspond to the text object positions in accordance with the exemplary process illustrated by the logic flow diagram of FIG. 8.

In FIG. 8, a logic flow diagram is shown that illustrates an exemplary process 406 for creating a cell descriptor for each cell of the document. The exemplary process 406 starts with step 802 in which the cell descriptor builder 214 divides the document into rows and columns to form cells based on the position information in the object position array, which was discussed above with respect to FIG. 7. In some embodiments of the present the invention, the cell descriptor builder 214 may form the rows and columns of the cells based on the positions of the text objects. In that regard, attention is briefly focused on FIG. 20, in which an exemplary document 2000 is shown which is divided into rows and columns that form cells. The borders that form the rows and columns in FIG. 20 are based on the top and side edge positions of the text objects 1902-1906. However, in other embodiments of the invention, the cell descriptor builder 214 may form the rows and columns of the cells based on the positions of the text objects and other objects, such as pictures, in the document. For example, the object descriptor may reference the position information of all of the text objects in a document and also the position information of the top-most picture object in the document to form the rows and columns of the cells.

Turning back to FIG. 8, in step 804, following step 802, the cell descriptor builder 214 creates a cell descriptor to represent each cell. In some embodiments of the present invention, the cell descriptor 214 loops through the information in the object position array and creates a cell descriptor for each pair of horizontal and vertical positions in the array. Furthermore, the cell descriptors created in step 804 may be stored in an array that is based on the row and column location of each corresponding cell (e.g., a two-dimensional array). Referring again briefly to FIG. 24, an exemplary table 2400 of cell descriptors is shown. The cell descriptors in this particular example indicate the number of columns, number of rows, and type of object represented by each cell descriptor. The cell descriptors created in step 804 may initially indicate one column, one row, and an undetermined type of object, which can be referred to as a raw cell descriptor. Characteristics relating to the cell descriptors will also be described further below with respect to FIGS. 24-27.

After step 804 of the exemplary process 406, in step 806, the cell descriptor builder 214 designates in the cell descriptor the type of object that the cell contains. Typically, the cell will contain either at least part of a text object or a picture object or no object. As discussed above in the brief reference to FIG. 24, the cell descriptor may include a variable that represents the type of object. For example, a "T" may refer to text, a "P" may refer to picture and an "N" to no object. However, in some embodiments of the invention, the cell descriptors alternatively indicate an index of the object that is contained by the cell, or, in the case of multiple object cell containment, the object which dominates the cell containment (i.e., "owns" or controls the cell).

Following step 806, in step 808, the cell descriptor builder 214 designates in the cell descriptor whether the cell is merged with any other cells. This indication can be made by the number of columns and number rows designation of the cell descriptor. As discussed above, the initial cell descriptors may indicate a single column and a single row, and thus, an unmerged cell, which is the case prior to subsequent processes of cell merging. There are various manners in which a cell descriptor can be configured to indicate whether the cell is merged with other cells and some of these techniques will be discussed further below with respect to FIGS. 9 and 10. Following step 808, the exemplary process 406 proceeds to step 408 of FIG. 4.

Figure 9:
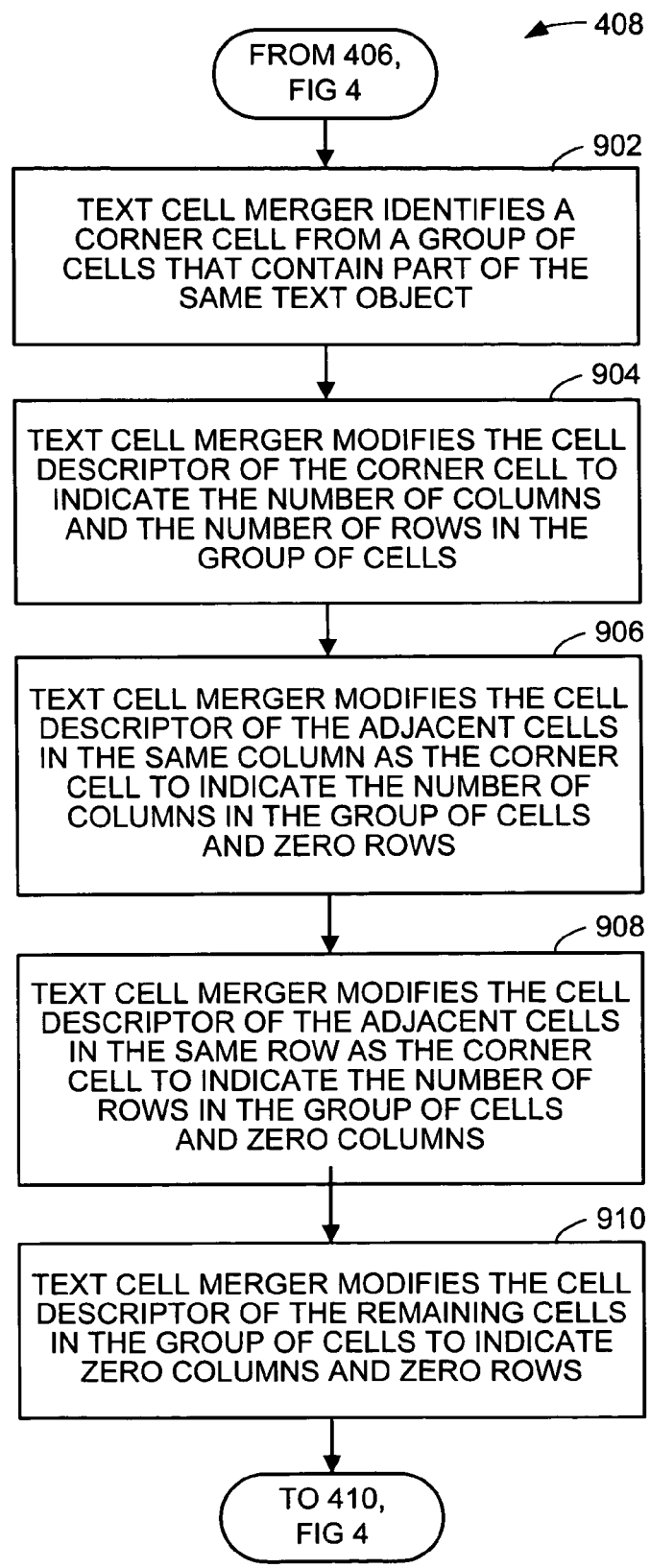
FIG. 9 is a logic flow diagram illustrating a process for merging cells that contain part of the same text object in accordance with an exemplary embodiment of the present invention.

Turning now to FIG. 9, a logic flow diagram is shown that illustrates an exemplary process 408 for merging (or grouping) cells that contain part of the same text object. A purpose of this process 408 is to format the cell descriptors to facilitate the identification of merged cell groups in accordance with other processes of the invention, which will be described below. The exemplary process 408 begins with step 902 in which the text cell merger 216 identifies a corner cell from a group of cells that contain parts of the same text object. Referring briefly to FIG. 21, an exemplary document 2100 is shown in which cells that contain parts of the same text objects are merged into merged text cells 1902-1906. Thus, referring to merged text cell 1902, the text cell merger in step 902 of the exemplary process 408 may identify the cell located at the second row R2 in the fourth column C4 of the exemplary document 2100.

Figure 25:
FIG. 25 illustrates an exemplary table of cell descriptors in accordance with the exemplary document illustrated in FIG. 21.

Referring back to FIG. 9, after step 902, the exemplary process 408 proceeds to step 904 in which the text cell merger 216 modifies the cell descriptor of the corner cell. In this step 904, the text cell merger 216 modifies the cell descriptor of the corner cell to indicate he number of columns and the number of rows in the group of cells that contain parts of the same text object. Referring briefly to FIG. 25, an exemplary table 2500 of cell descriptors is shown. Referring to the cell descriptor located at the second row R2 in the fourth column C4 of the table 2500, it can be seen that the cell descriptor of the corner cell of the merged cell group has been modified to indicate that the merged cell includes two columns and one row.

Step 906 follows step 904 in the exemplary process 408. In step 906, the text cell merger 216 modifies the cell descriptor of the adjacent cells in the same column as the corner cell of the merged cell group to indicate the number of columns in the group of cells and zero rows. Following step 906, in step 908, the text cell merger 216 modifies the cell descriptor of the adjacent cells in the same row as the corner cell of the merged cell group to indicate the number of rows in the group of cells and zero columns. Referring again briefly to FIG. 25 and more specifically to the merged cell group that has a corner cell located at the second row R2 in the fourth column C4 of the exemplary table 2500, it can be seen that the cell descriptor of the cell adjacent to the corner cell, in the same row, has been modified to indicate zero columns and one row in accordance with step 908 of the exemplary process 408.

Turning back to FIG. 9, step 910 follows step 908 in which the text cell merger 216 modifies the cell descriptor of any remaining cells in the group of cells to indicate zero columns and zero rows. In the example of FIG. 25, there are no remaining cells in any of the merged cell groups. However, in the case where there are remaining cells in the group, the text cell merger 216 will modify their cell descriptors to indicate zero columns and zero rows in a similar manner to the modification that occurs in step 1014, which is described below for FIG. 10. Following step 910, the exemplary process proceeds to step 410 of FIG. 4.

In one embodiment, the steps described by blocks 906-910 are not performed because all merged cells are simply skipped. As soon as the corner cell is reached and find out about size of the block, all merged cells are skipped, so it does not matter if they contain correct size of block or not. In other words, only left top cell contains information that is used in process.

It is noted, in regard to the exemplary process 408, that in some embodiments of the present invention, the text cell merger 216 merges cells that only contain parts of the same text object. Thus, if a cell is occupied by parts of more than one text object or by part of a text object and part of another type of object (such as a picture object), the cell will not be merged by the text cell merger 216 in such embodiments. Further, in such embodiments, the text cell merger 216 will not merge a cell that contains part of an overlapped text object. For example, if a cell contains part of a text object that overlaps or is overlapped by part of another object, such as a text or picture object, the text cell merger 216 will not merge the cell with other cells containing parts of the same text object in such embodiments.

In regard to the foregoing discussion, an object may be considered to overlap another object if their edges touch or slightly overlap. In some embodiments of the present invention, two or more objects can be determined to overlap if at least part of each object can be represented by the same cell descriptor. In such embodiments, the determination of which object dominates the cell containment (i.e., "owns" or controls the cell) can be based on the topmost object (or portion thereof) in the cell. For example, between step 802 and step 804 of FIG. 8, the cell descriptor builder 214 can enumerate each object (or portion thereof) in the cells of the document according to its z-order (e.g., from top to bottom in the z-plane of the document). The topmost object (or portion thereof) in the cell, based on the z-order enumeration, can be designated to control the cell and determine the object content of the cell (e.g., text or picture).

Additionally, with regard to the exemplary process 408, in some embodiments of the present invention, a text object that overlaps or is overlapped by another object, such as a text or picture object, is converted to a picture or image object, since the text object typically can not be manipulated by text operations (such as select and edit, or search) in such an overlapping state. As discussed above, the text cell merger 216 will not merge such converted objects, since they are no longer text objects. Exceptions to converting or bitmapping the text object exist and are described in greater detail below with regard to FIG. 31-35. Alternatively, in other embodiments of the present invention, the top-most object of two or more overlapping objects may be assumed to own or control the cell for the purpose of merging, as discussed above. In such embodiments, the text cell merger 216 will merge a cell that contains part of the top-most overlapping text object in the cell, with other cells that contain part of the same text object. Furthermore, in some of these embodiments of the invention, the other overlapping objects (that are not the top-most object) will be converted to picture or image objects.

Figure 10:
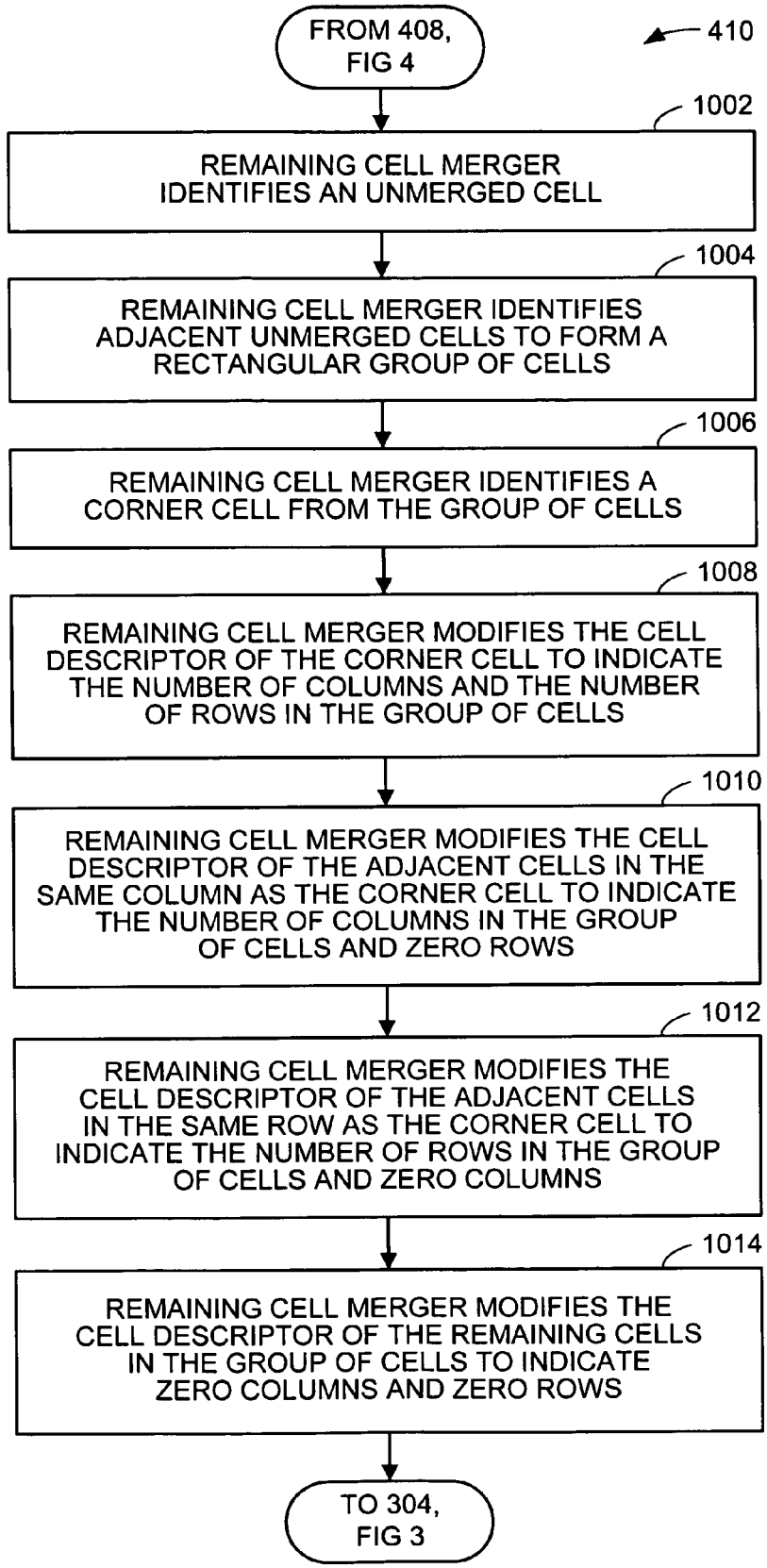
FIG. 10 is a logic flow diagram illustrating a process for merging cells that were not merged by the text cell merger in accordance with an exemplary embodiment of the present invention.
Figure 22:
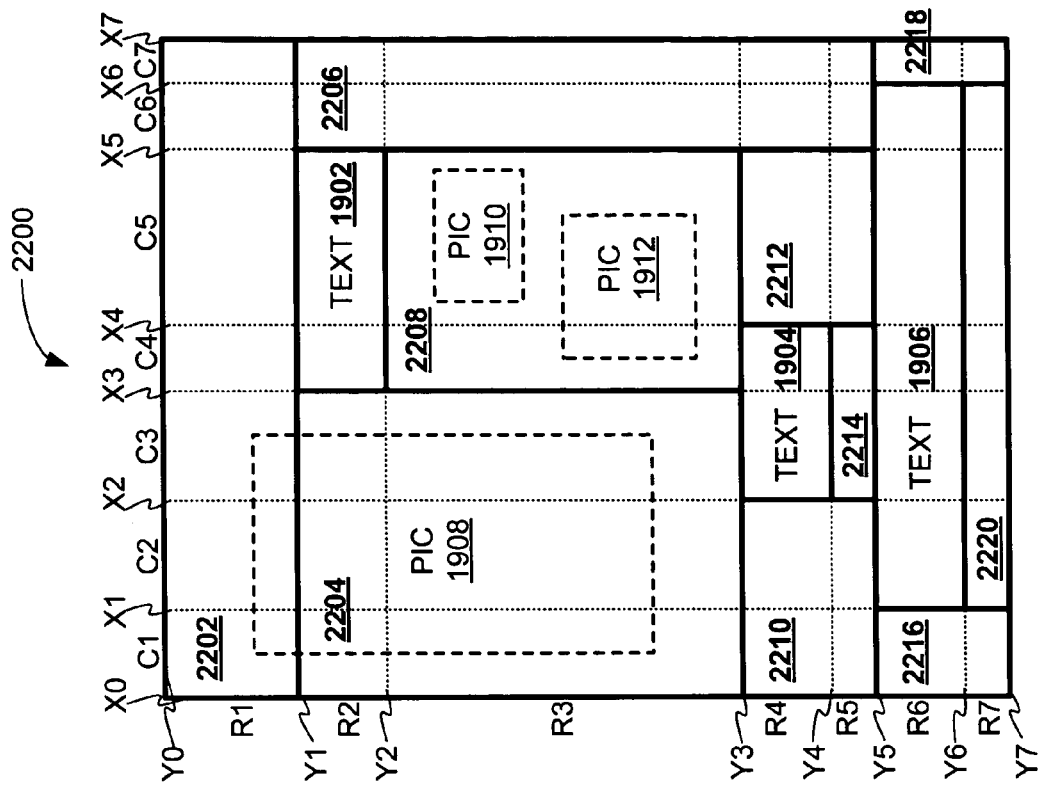
FIG. 22 illustrates an exemplary document comprising a merger of remaining cells that do not contain text objects, as constructed in accordance with an exemplary process illustrated by the logic flow diagram of FIG. 10.

In FIG. 10 a logic flow diagram is shown that illustrates an exemplary process 410 for merging (or grouping) cells that were not merged by the text cell merger 216 in the exemplary process 408 described above. Similar to the process 408, described above, a purpose of this process 410 is to format the cell descriptors to facilitate the identification of merged cell groups in accordance with other processes of the invention. The exemplary process 410 begins with step 1002 in which the remaining cell merger 218 identifies an unmerged cell in the document. Following step 1002, in step 1004, the remaining cell merger 218 identifies any adjacent unmerged cells in the document in order to form a rectangular group of cells. Referring briefly to FIG. 22, an exemplary document 2200 is shown in which a remaining cell group 2204 has been merged. As discussed with respect to step 1004 of the exemplary process 410, the merged remaining cell group 2204 is rectangular.

Turning back to FIG. 10, the exemplary process 410 proceeds from step 1004 to step 1006 in which the remaining cell merger 218 identifies a corner cell from a group of merged remaining cells. Then, in step 1008 of the exemplary process 410, the remaining cell merger 218 modifies the cell descriptor of the corner cell to indicate the number of columns and the number of rows in the merged group of cells. Turning briefly to FIG. 26, an exemplary table 2600 of cell descriptors is shown. Referring specifically to the group of cells that has a corner cell located in the second row R2 at the first column C1 of the exemplary table 2600, it can be seen that the cell descriptor for this cell has been modified to indicate a merged cell group that includes three columns and two rows of cells. To facilitate the description, the merged cell grouping of three columns and two rows is further indicated by the bold lines surrounding the adjacent cells in the exemplary table 2600.

Referring back to FIG. 10, in step 1010, which follows step 1008, the remaining cell merger 218 modifies the cell descriptor of the adjacent cells that are in the same column as the corner cell in order to indicate the number of columns in the group of cells and zero rows. Turning back to FIG. 26 and referring to the corner cell located in the second row R2 at the first column C1 of the exemplary table 2600, it can be seen that the cell descriptor of an adjacent cell below it and in the same column (i.e., row R3 at column C1) has been modified. More specifically, the cell descriptor of the adjacent cell has been modified to indicate three columns and zero rows in accordance with step 1010 of the exemplary process 410.

Continuing with the description of the exemplary process 410, in step 1012 the remaining cell merger 218 modifies the cell descriptor of the adjacent cells that are in the same row as the corner cell to indicate the number of rows in the group of cells and zero columns. Referring again to FIG. 26 and looking at the cells that are adjacent to the corner cell located in the second row R2 at the first column C1 of the exemplary table 2600 (i.e., row R2, columns C2-C3), it can be seen that the cell descriptor has been modified to indicate zero columns and two rows for the two adjacent cells in the group.

Following step 1012, in step 1014 of the exemplary process 410, the remaining cell merger 218 modifies the cell descriptor of any remaining cells in the group of cells to indicate zero columns and zero rows. Once again referring to FIG. 26, attention is focused on the cells that are adjacent to the corner cell located in the second row R2 at the first column C1 of the exemplary table 2600. More specifically it can be seen that the cell descriptors for the cells that are located in the third row R3 at the second and third columns C2, C3 of the exemplary table 2600 have been modified to indicate zero columns and zero rows in accordance with step 1014 of the exemplary process 410. The exemplary process 410 finally proceeds from step 1014 to step 304 of FIG. 3.

Figure 11:
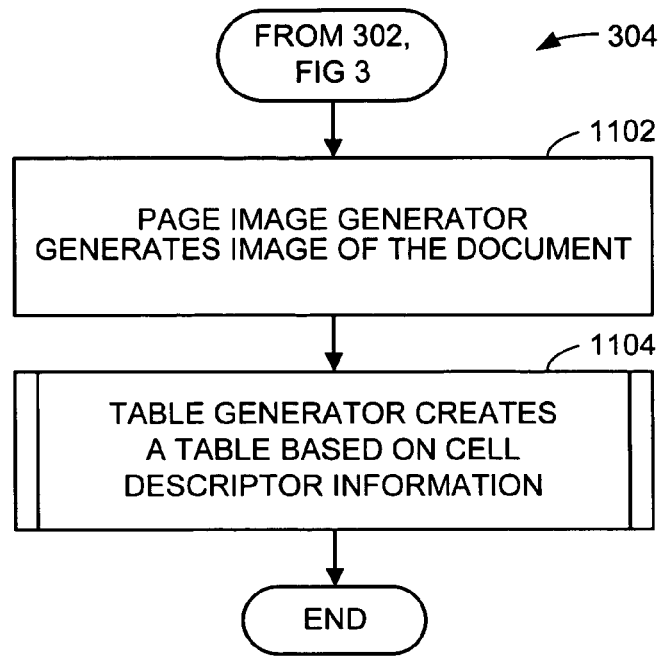
FIG. 11 is a logic flow diagram illustrating a process for generating a table version of a document based on a computed table layout of the document in accordance with an exemplary embodiment of the present invention.

Turning now to FIG. 11, a logic flow diagram is shown that illustrates an exemplary process for generating a table version of a document based on a computed table layout of the document. It is noted that in the subsequent discussion of the exemplary embodiments of the present invention, references will sometimes be made to the use of HTML (i.e., hyper-text markup language), for example with regard to representing a table. However, these references to HTML are made merely for exemplary purposes to facilitate the description of the invention, and the invention is not limited to the application of HTML in such descriptions. Moreover, it is noted with regard to such descriptions that HTML is known in the art (see for example, information provided by the World Wide Web Consortium at http://www.w3.org/).

The exemplary process 304 begins with step 1102 in which the page image generator 222 generates an image of the document. This image may be generated in various formats, such as GIF (graphics interchange format) or JPEG (joint photograph experts group) formats. The generated image is typically stored in a memory (such as the hard disk drive 127 or the system memory 122) for subsequent use. Following step 1102, in step 1104, the table generator 220 creates a table based on cell descriptor information that was created in previous steps associated with computing the table layout. In some embodiments of the present invention, the table can be formatted in HTML. Step 1104 may include several substeps, some of which will be discussed further below in connection with FIG. 12.

Figure 12:
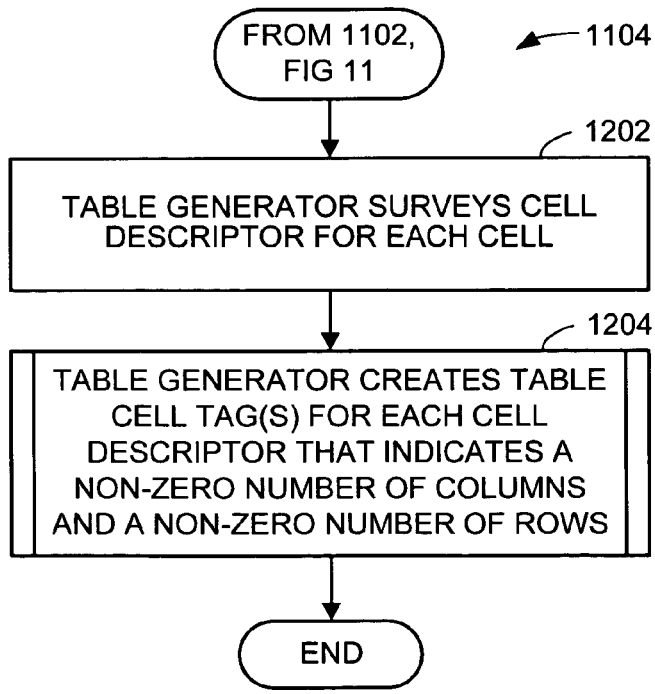
FIG. 12 is a logic flow diagram illustrating a process for creating a table based on cell descriptor information in accordance with an exemplary embodiment of the present invention.

FIG. 12 shows a logic flow diagram of an exemplary process 1104 for creating a table in accordance with the logic flow diagram illustrated in FIG. 11. The exemplary process 1104 starts at step 1202 in which the table generator 220 surveys the cell descriptor for each cell. The exemplary process 1104 proceeds to step 1204 in which the table generator 220 creates one or more table cell tags for each cell descriptor that indicates a non-zero number of columns and a non-zero number of rows. Thus, a corner cell, which has a cell descriptor that indicates the number of columns and number of rows that make up the merged cell, as discussed above, will have a table cell tag generated for it by the table generator 220 in step 1204. In some embodiments of the present invention, the table cell tags created in step 1204 can be formatted in HTML. Step 1204 may include several substeps, which will be discussed further below in connection with FIG. 13.

Figure 13:
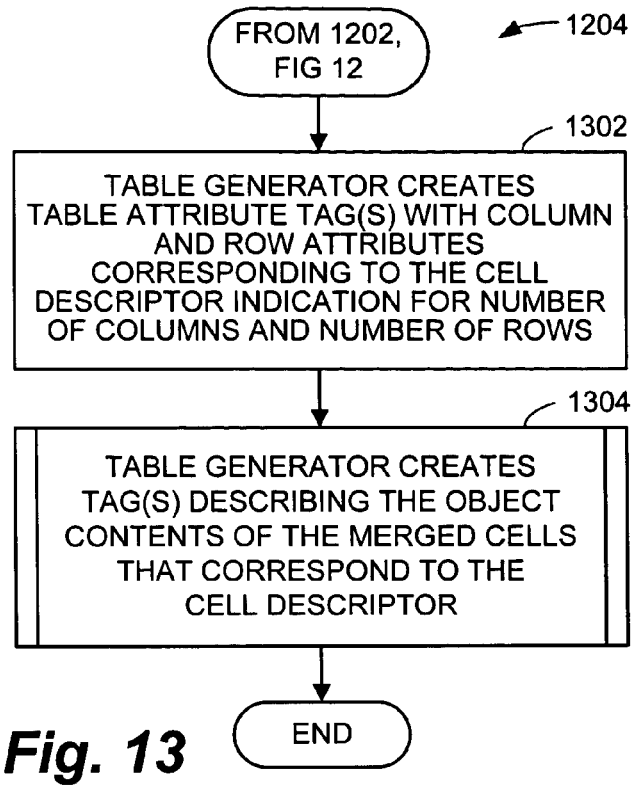
FIG. 13 is a logic flow diagram illustrating a process for creating one or more table cell tags for each cell descriptor that indicates a non-zero number of columns and a non-zero number of rows in accordance with an exemplary embodiment of the present invention.

Turning to FIG. 13, a logic flow diagram is shown that illustrates an exemplary process 1204 for creating a table cell tag. The exemplary process 1204 starts at step 1302 in which the table generator 220 creates one or more table attribute tags that include column and row attributes that correspond to the cell descriptor indicator for the number of columns and number of rows. In some embodiments of the invention, the table attribute tags created in step 1302 may be formatted in HTML. For example, the table generator may create one or more tags that include HTML "colspan" and "rowspan" attributes that correspond to the cell descriptor indicator for the number of columns and number of rows.

Following step 1302, in step 1304 of the exemplary process 1204, the table generator 220 creates one or more tags that describe the object contents of the merged cells that correspond to the cell descriptor. Similar to step 1302, the tags created in step 1304 can be formatted in HTML in some embodiments of the invention. For example, referring briefly to FIG. 28, an exemplary listing 2800 of an excerpt of HTML code is shown that corresponds to several merged cells. The HTML table code listing 2800 includes "colspan" and "rowspan" tag attributes, as well as contents information for text and images. The step 1304 includes several substeps that will be described below in connection with FIG. 14.

Figure 14:
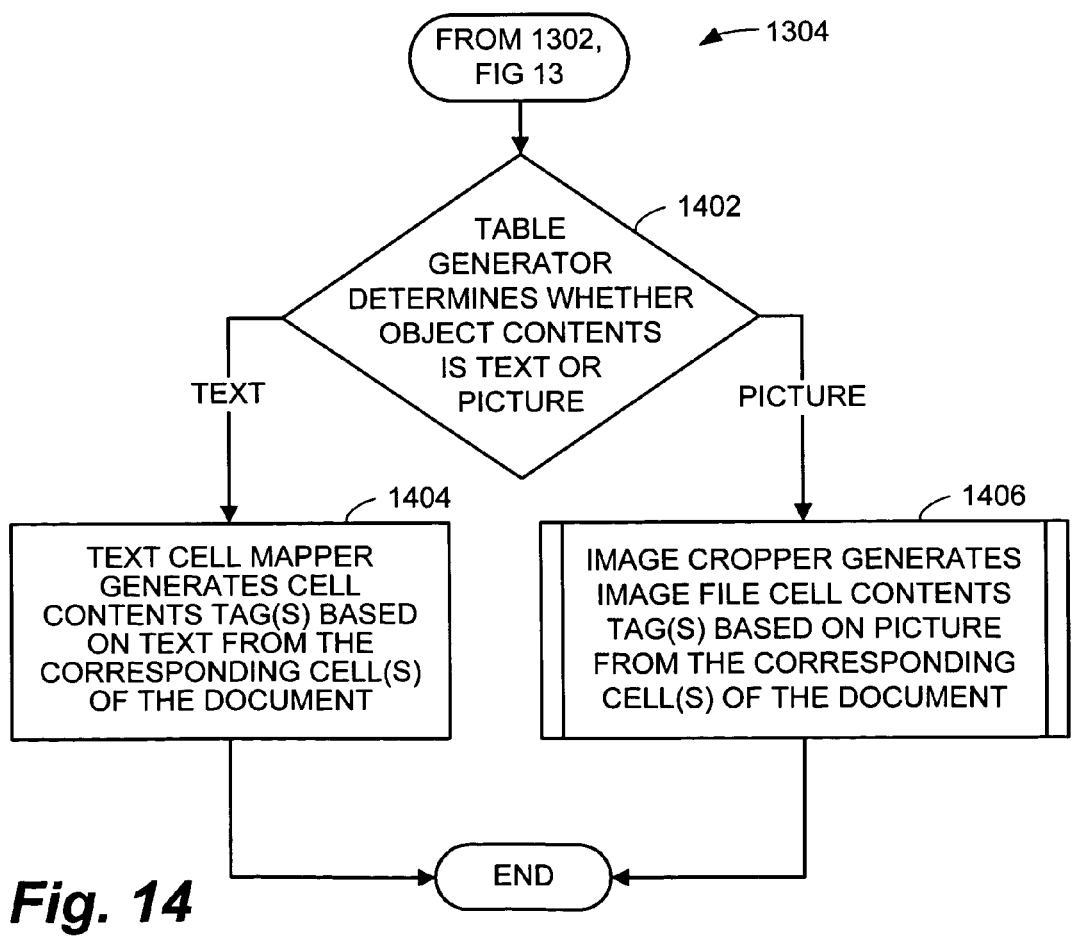
FIG. 14 is a logic flow diagram illustrating a process for creating one or more tags describing the object contents of the merged cells that correspond to a cell descriptor in accordance with an exemplary embodiment of the present invention.

In FIG. 14, a logic flow diagram is shown that illustrates the exemplary process 1304 for creating one or more tags that describe the object contents of cells in accordance with the logic flow diagram of FIG. 13. The exemplary process 1304 begins with decision step 1402 in which the table generator 220 determines whether the object content is text or a picture. This determination by the table generator 220 may be made based on information from the cell descriptor, as discussed above. Moreover, in some embodiments, the table generator may also consider other types of objects in the document. If the table generator 220 determines that the object contents is text, the exemplary process 1304 proceeds along the "text" branch to step 1404 in which the text cell mapper 224 generates one or more cell contents tags based on text from the corresponding cells of the document. Alternatively, if the table generator 220 determines that the object contents is a picture, the exemplary process proceeds along the "picture" branch to step 1406 in which the image cropper 226 generates one or more image file cell contents tags based on the picture from the corresponding cells of the document. Step 1406 includes several substeps which will be described below in connection with FIG. 15.

Figure 15:
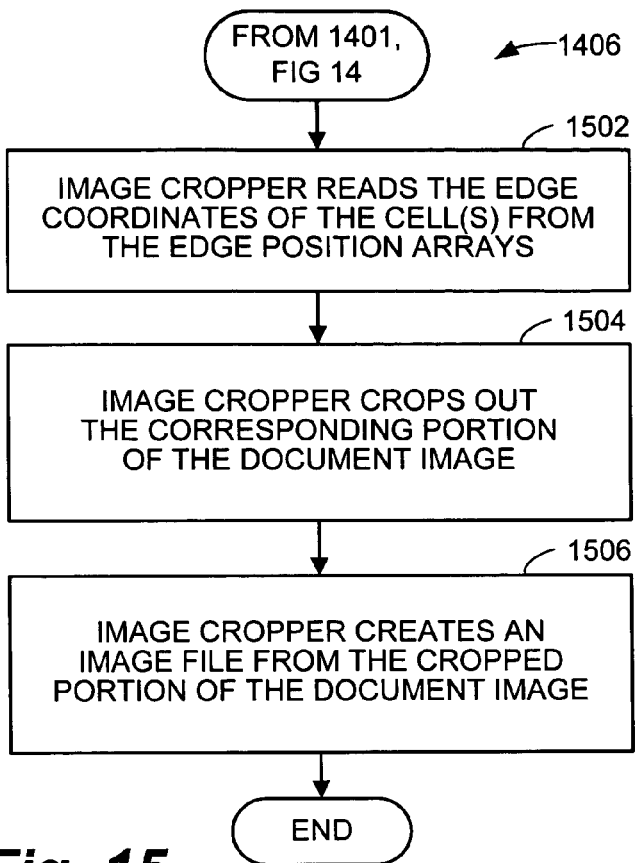
FIG. 15 is a logic flow diagram illustrating a process for generating one or more image file cell contents tags based on at least a portion of a picture from one or more corresponding cells of a document in accordance with an exemplary embodiment of the present invention.

Turning now to FIG. 15, a logic flow diagram is shown that illustrates an exemplary process 1406 for generating one or more cell contents tags in accordance with the logic flow diagram of FIG. 14. The exemplary process 1406 begins with step 1502 in which the image cropper 226 reads the edge coordinates of the cells from the vertical and horizontal edge position arrays, which were discussed above. Following step 1502, in step 1504, the image cropper 226 crops out the corresponding portion of the document image, which was created in step 1102 of the exemplary process 304 (FIG. 11). Then, in step 1506, the image cropper 226 creates an image file from the cropped portion of the document image. This image file may be in one of various formats, such GIF or JPEG.

Figure 16:
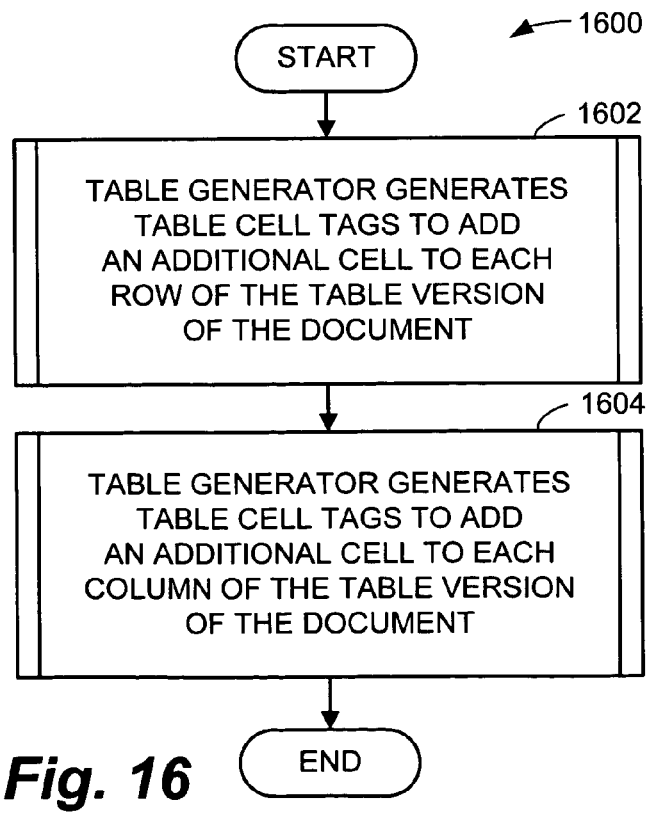
FIG. 16 is a logic flow diagram illustrating an overview of an exemplary process for adding an additional column and an additional row to a table version of a document.

Turning now to FIG. 16, an overview of an exemplary process 1600 for adding an additional column and additional row to a table version of a document is illustrated. This process 1600 may be applied, for example, to a table version of a document generated by the process 304 of FIG. 11 described above. The exemplary process 1600 begins with step 1602 in which the table generator 220 generates table cell tags to add an additional cell to each row of the table version of a document. Step 1602 includes several substeps that will be described further below in connection with FIGS. 17 and 18. Following step 1602, in step 1604 of the exemplary process 1600, the table generator 220 generates table cell tags to add an additional cell to each column of the table version of the document. Step 1604 also includes several substeps that will be described further below in connection with FIGS. 17 and 18. The table cell tags created in steps 1602 and 1604 can be formatted in HTML, in accordance with some embodiments of the present invention.

One purpose for adding the additional column and additional row to the table version of a document by the exemplary process 1600 is to enable certain application programs to accurately interpret the table version of the document. For example, some application programs have difficulty interpreting the row and column attributes of the table version of a document when the edge cells of the document are all part of merged cell groups. Adding an additional column and row of unmerged cells to the table version of the document, in accordance with the process 1600, can resolve this problem by, for example, more clearly indicating the height and width attributes of rows and columns, respectively, of the table.

Figure 17:
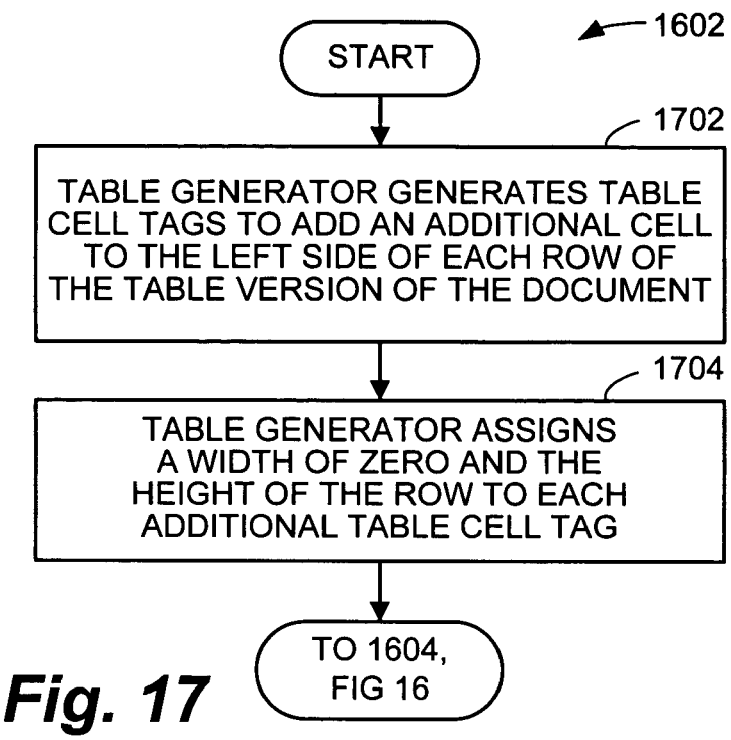
FIG. 17 is a logic flow diagram illustrating an exemplary process for adding an additional cell to each row of a table version of a document.

FIG. 17 shows a logic flow diagram illustrating an exemplary process 1602 for generating table cell tags to add an additional cell to each row of a table version of a document. The exemplary process 1602 begins with step 1702 in which the table generator 220 generates table cell tags to add an additional cell to the left side of each row of the table. Alternatively, in some embodiments, the table generator 220 may generate table cell tags to add an additional cell to the right side of each row of the table. Following step 1702, in 1704, the table generator 220 assigns a width of zero and the height of the respective row to each additional table cell tag. The additional table cell tags are assigned a width of zero since they are not intended to hold any object contents and are assigned the respective row height to aid application program interpretation of the row heights of the table. Following step 1704, the exemplary process 1602 proceeds to step 1604 of FIG. 16.

Figure 18:
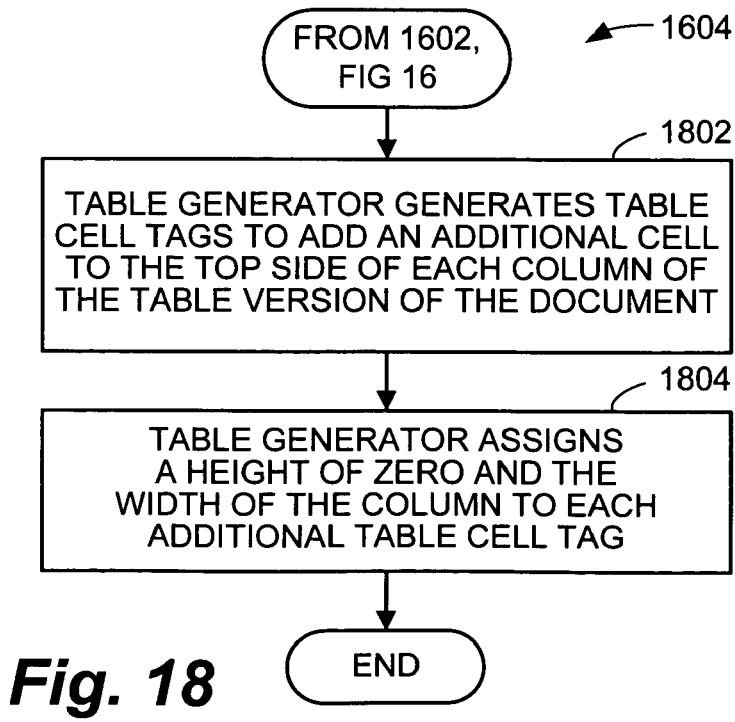
FIG. 18 is a logic flow diagram illustrating an exemplary process for adding an additional cell to each column of a table version of a document.

Referring now to FIG. 18, a logic flow diagram illustrates an exemplary process 1604 for generating table cell tags to add an additional cell to each column of a table version of a document. The exemplary process 1604 begins with step 1802 in which the table generator 220 generates table cell tags to add an additional cell to the top side of each column of the table. In some embodiments, alternatively, the table generator 220 may generate tags to add an additional cell to the bottom side of each column of the table. Following step 1802, in step 1804, the table generator 220 assigns a height of zero and the width of the respective column to each additional cell tag that was added in step 1802. Similar to the reasoning above for step 1704 of FIG. 17, the additional table cell tags are assigned a height of zero since they are not intended to hold any object contents and are assigned the respective column width to aid application program interpretation of the column widths of the table.

In FIG. 19, an exemplary document 1900 is illustrated that includes text objects 1902-1906 and picture objects 1908-1912. The layout and actual content of the text objects 1902-1906 and picture objects 1908-1912 in the document 1900 are exemplary to facilitate a discussion of the embodiments of the present invention. An essentially infinite number of layouts and actual contents of objects may exist and all such variations apply within the scope of the present invention. In the exemplary document 1900, the text objects 1902-1906 and picture objects 1908-1912 are represented by bounding boxes. It is common to use bounding boxes in documents to represent the boundaries of an object, as is known in the art. However, other methods may be used to represent the objects within the scope of the present invention, for example, the actual outline of the object contents.

Turning now to FIG. 20, an exemplary document 2000 is illustrated that is divided into rows and columns to form cells that correspond to the positions of the text objects 1902-1906. The formation of the cells in the exemplary document 2000 is in accordance with the steps in the logic flow diagram illustrated in FIG. 8, which was discussed above. As shown in FIG. 20, the rows R1-R7 are formed by horizontal lines Y0-Y7, and these horizontal lines are based on the top and bottom edges of the text objects 1902-1906, and, in some embodiments, the top and bottom edges of the exemplary document 2000 as well. The cells are also formed by columns C1-C7, which are formed by vertical lines X0-X7. The vertical lines X0-X7 are based on the left and right edges of the text objects 1902-1906, and, in some embodiments, the left and right edges of the exemplary document 2000 as well. Each cell in the exemplary document 2000 can be identified based on its position in a row and column. For example, the text object 1902 occupies two cells. The first cell to the left in the document 2000 can be identified as being located in row R2 at column C4, and the second cell that the text object 1902 occupies can be identified as located in row R2 at column C5. In this regard, it can be seen that the content of the text objects 1902-1906 may occupy more than one cell in the exemplary document 2000. In some embodiments, the horizontal and vertical lines that form the cells of the document may also be based on the edges of non-text objects, such as a picture object, as discussed above with respect to FIG. 8. For example, if the top edge of a picture object occupies the top-most position of the objects in the document, that top edge of the picture object may be used as a reference for a horizontal line that forms cells in the document. More specifically, for example, the top edge of picture object 1908 could be used in some embodiments as a reference for a horizontal line that forms cells in the exemplary document 2000. Dividing the document based on all objects rather than just text objects takes into account that some images may be located on top of text objects in the z coordinate direction and also avoids exporting bitmaps that contain empty spaces.

Turning to FIG. 21, an exemplary document 2100 is shown in which cells that contain part of the same text object are merged. The merging of common text cells was discussed above with respect to the logic flow diagrams illustrated in FIG. 4. In FIG. 21, the merged text cells are represented by a bold border around the text object. For example, text object 1902 is contained by cells located in row R2 at column C4 and column C5, and these cells combine to form the merged text cell 1902. Similarly, text object 1904 is contained by the cells in row R4 at column C3 and column C4, and these cells are merged to form merged text cell 1904. Finally, text object 1906 is contained by the five cells that are in row R6 and span from column C2 to column C6, and these cells are merged to form merged text cell 1906. It is noted that although in the exemplary document 2100, the text objects are only contained within one row, in other documents, the text cells may be contained in multiple rows, for example, if the edges of other non-text objects are used to form lines that form the cells. The cells that are not merged to form the text cells 1902-1906 are referred to as remaining cells in this description of the invention.

In FIG. 22, an exemplary document 2200 is illustrated in which the remaining cells are also merged, in addition to the merged text cells 1902-1906, which were discussed above. One benefit of merging the remaining cells is to reduce the amount of individual cell contents information that needs to be transferred when a document is exported to one or more computers in a distributed network. For example, referring to the cells located in row R1 at columns C1-C3, a part (or portion) of picture object 1908 is contained in each of these cells. If the cells were left unmerged, each part of the picture object 1908 in each cell would have to be represented by a file and transferred during a document export, which would typically result in a large amount of transfer overhead. Thus, by merging the remaining cells of a document, the transfer overhead to export the document is reduced, since the cell contents information is consolidated.

The merging of the remaining cells can be conducted in various ways. For example, an exemplary process 410 was discussed above with respect to FIG. 10 to merge the remaining cells in a document. In the case of the exemplary document 2200 in FIG. 22, an exemplary manner of merging the cells involves scanning the document from left to right and then top to bottom to form rectangular groups of unmerged cells that remain after the text cell merging process 408, described above for FIG. 8. For example, in the case of merged cell 2202 at the top-left portion of the exemplary document, the cell located in row R1 at column C1 is identified by the remaining cell merger 218 as an unmerged remaining cell. Then the adjacent cells from left to right in row R1 from columns C2-C7 are identified by the remaining cell merger 218 as additional unmerged remaining cells to form a rectangular group of cells. Since the merged text cell 1902 borders the bottom of the group of cells in row R1, the remaining cell merger 218 determines that merged cell 2202 can form a rectangular group of cells as shown in FIG. 22.

Continuing the above description of an exemplary manner to merge the remaining cells of the document 2200 of FIG. 22, after the remaining cell merger 218 creates the merged cell group 2202, it scans down and starts another left to right scan, in this case starting with the cell at row R2 in column C1. The remaining cell merger scans from left to right until it meets the edge of a merged text object 1902 to identify a second rectangular group of unmerged remaining cells located in row R2 at columns C2 and C3. Since the cell in row R2 at column C3 borders the edge of merged text object 1902, the remaining cell merger 218 then scans down to identify unmerged remaining cells and identifies the cells in row R3 at columns C1-C3. The remaining text cell merger 218 does not go below row R3 because merged text cell 1904 borders row R3 at horizontal line Y4. Thus, merged cell 2204 is formed by the remaining cell merger 218 as indicated in FIG. 22.

Note, with respect to the document 2200 of FIG. 22, that merged cell 2202 contains a part of picture object 1908 and merged cell 2204 contains the remaining part of picture object 1908. In accordance with an exemplary embodiments of the present invention, picture objects can be separated for the purpose of exporting the information to one or more computers in a distributed network, without affecting the appearance of the picture object when it is reproduced in an application program executed on the computers. However, as discussed above, text objects need to be maintained in their original format so that the exported text can be accurately reproduced and manipulated as text in an application program of one or more computers in a distributed network.

Continuing with the above description of an exemplary manner to merge the remaining cells of the document 2200, after identifying merged cell 2204, the remaining cell merger 218 scans to the right until it identifies the unmerged remaining cell at row R2 in column C6. The remaining cell merger 218 then continues to scan right to identify the adjacent cell at row R2 in column C7, which is at the edge of the document 2200. Having scanned left to the edge of the document 2200, the remaining cell merger 218 then scans down until it reaches the edge of a merged text object, in this case merged text object 1906. As a result, the remaining cell merger 218 forms merged cell 2206 that spans from row R2 at columns C6 and C7 to row R3 at columns C6 and C7, as indicated in FIG. 22. The remaining cell merger 218 continues the process of a left to right, top to bottom scan, as described above, which results in the formation of the other remaining merged cells 2210-2220, as depicted in FIG. 22.

It is noted that, in the exemplary document 2200, several of the merged cells do not contain any objects. For example, merged cells 2206, 2210 and 2212 do not contain any objects, whereas merged cells 2202, 2204 and 2208 each contain picture objects. In some embodiments, some cells that do not contain any objects may not be included as part of the merged cell groups.

In that regard, FIG. 23 illustrates an alternate exemplary document 2300 that includes merged remaining cells. The exemplary document 2300 is an example where the remaining cell merger 218 did not merge certain cells that do not contain any objects. In this case, the remaining cell merger 218 did not merge the cells in the bottom row R7 and in the right-most column C7, since there are no text objects or picture objects contained in these cells and there are no adjacent cells below or to the right of these cells. Thus, in some embodiments, entire rows or columns of empty cells that are beyond the extent of the scan of the remaining cell merger 218 may not be included in the merged cell groups. For example, in the case of the exemplary document 2300, the remaining cell merger 218 scanned from left to right and top to bottom to merge the remaining cells. Therefore, the empty cells in column C7 were beyond the extent of the left to right scan of cells that contain objects in the exemplary document 2300, considering that the cell in column C6 at row R6 contains part of text object 1906. Similarly, the empty cells in row R1 were beyond the extent of the top to bottom scan by the remaining cell merger 218 of cells that contain objects, considering that the cells in row R6 from columns C2-C6 contain text object 1906.

As discussed above with respect to FIG. 22, the manner in which the remaining cell merger 218 identifies remaining merged cells can vary in different embodiments of the present invention. For example, the remaining cell merger may start at the top right of the document and scan from top to bottom and then right to left to form merged cells. Thus, the formation of merged cells depicted in FIGS. 22 and 23 might be different in other embodiments of the invention where the remaining cell merger 218 scans for remaining cells in a different manner from that described above.

Turning now to FIG. 24, an exemplary table 2400 of cell descriptors is illustrated in accordance with the exemplary document 2000 illustrated in FIG. 20. In this regard, there are cell descriptors in the exemplary table 2400 that represent each cell of the exemplary document 2000. For example, the cell descriptor shown in the cell at row R1 in column C1 in the exemplary table 2400 corresponds to the cell in the exemplary document 2000 located at row R1 in column C1.

Below the exemplary table 2400 in FIG. 24 is an exemplary legend for the cell descriptors. In this exemplary embodiment, the cell descriptors are represented by three entries in parenthesis. The first and second entries represent the number of columns and the number of rows, respectively, related to a merged cell group. The third entry is a symbol that represents the type of object that the cell contains. In this regard, the type of object can be represented, for example, by a "T" to indicate text, a "P" to picture, or an "N" to represent no object in the cell, as also indicted in the legend below the exemplary table 2400. As discussed above with respect to FIG. 8, in some embodiments of the invention, an index of the object that is contained by the cell is used to refer to information about the type of object, for example, information recorded in an object position array (discussed above for FIG. 7), as an alternative to an object type symbol.

The exemplary table 2400 in FIG. 24 depicts initial (or raw) cell descriptors that are assigned to all cells prior to any of the cells being merged. Thus, each cell descriptor indicates a cell group that consists of one column and one row (i.e., one cell) and the corresponding object type contained in the cell. For example, referring to the cell descriptor in the exemplary table 2400 at row R1 in column C1, the cell descriptor indicates that the cell group consists of one column and one row and contains a picture object. Referring to the exemplary document 2000 in FIG. 20, it can be seen that the cell at row R1 in column C1 contains part of the picture object 1908, which corresponds with the initial information of the cell descriptor, as described above. In some embodiments of the invention, raw cell descriptors may initially indicate that the cell contains no object prior to further processing of the cell descriptors.

As another example, in the exemplary table 2400 of FIG. 24, the cell descriptor at row R2 in column C4 indicates a cell group that consists of one column and one row that contains a text object. This cell descriptor corresponds to the cell in the exemplary document 2000 of FIG. 20 at row R2 in column C4 that contains part of the text object 1902. As yet another example, in the exemplary table 2400, the cell descriptor at row R4 in column C1 indicates a cell group that consists of one column and one row that contains no object. This cell descriptor corresponds to the cell in the exemplary document 2000 of FIG. 20 located at row R4 in column C1, which does not contain an object. Thus, the exemplary table 2400 of FIG. 24 contains initial cell descriptors that are created prior to any merging of cells.

Turning now to FIG. 25, an exemplary table 2500 of cell descriptors is illustrated that represents the cells shown in the exemplary document of FIG. 21. In this regard, several merged cells are indicated in the exemplary table 2500. These merged cells correspond to the merged text cells 1902-1906 in FIG. 21. For example, the merged cells indicated in the exemplary table 2500 at row R2 in columns C4 and C5 correspond to the merged text cell 1902 shown in the exemplary document 2100 of FIG. 21. Similarly, the merged cells indicated in the exemplary table 2500 at row R4 in columns C3 and C4 correspond to the merged text cell 1904 in FIG. 21. Finally, the merged cells indicated in the exemplary table 2500 at row R6 in columns C2-C6 correspond to the merged text cell 1906 in the exemplary document 2100 of FIG. 21.

As discussed above, the text cell merger 216 modifies the cell descriptors when it identifies merged cells. For example, the cell descriptors that correspond to the merged text cell 1902 have been modified from their initial state that was discussed with respect to the exemplary table 2400 of FIG. 24. Thus, in the exemplary table 2500, the cell descriptor for the corner cell of the merged text cell located at row R2 in column C4 is modified to indicate a merged cell group that consists of two columns and one row, in accordance with the process 408 of FIG. 9 discussed above. Similarly, the cell descriptor for the adjacent cell to that corner cell, located at row R2 in column C5, is modified to indicate zero columns and one row, also in accordance with the process 408 of FIG. 9.

As another example, in the exemplary table 2500 at row R6 in columns C2-C6, the cell descriptors have been modified to correspond to the merged text cell 1906 in the exemplary document 2100 of FIG. 21. In this regard, a cell descriptor for the corner cell at row R6 in column C2 is modified to indicate a merged cell group that consists of five columns and one row, in accordance with the process 408 of FIG. 9 discussed above. Furthermore, the cell descriptors of the merged cells that are adjacent to this corner cell, and in the same row R6, are modified to indicate zero columns and one row, in accordance with the process 408 of FIG. 9.

In FIG. 26, an exemplary table 2600 of cell descriptors is illustrated that corresponds to the exemplary document 2200 of FIG. 22. In this regard, the cell descriptors in the exemplary table 2600 are further modified, in contrast to the cell descriptors discussed above with respect to the exemplary table 2500 of FIG. 25, to include the remaining merged cells. For example, in the exemplary table 2600 a merged remaining cell is indicated by the cell indicators at row R1 in columns C1-C7. These cell indicators correspond to the merged cell 2202 shown in the exemplary document 2200 of FIG. 22.

In accordance with the exemplary process 410 of FIG. 10, the cell descriptors in the exemplary table 2600 that correspond to the corner cells of the merged cell group are modified to indicate the number of columns and the number rows that make up the merged groups. For example, the cell descriptor at row R2 in column C1 of the exemplary table 2600 are modified to indicate a merged cell group that consists of three columns and two rows, which corresponds to the merged cell 2204 of FIG. 22. Similarly, the cell indicators in the exemplary table 2600 that correspond to the cells that are adjacent to the corner cell of each cell group are modified in accordance with the exemplary process 410. For example, the cell descriptors that correspond to the cells that are adjacent to the corner cell of merged cell 2204, at row R2 in column C1, are merged as follows. The cell descriptors at row R2 in columns C2-C3 are modified to indicate zero columns and two rows. The cell indicator at row R3 in column C1 is modified to indicate three columns and zero rows. And, the cell indicators at row R3 in columns C2-C3 is modified to indicate zero columns and zero rows.

As discussed above, the cell descriptors are modified in accordance with process 408 (FIG. 9) and process 410 (FIG. 10) to facilitate the generation of a table version of the document. Thus, the table generator 220 can identify a merged cell based on the information of the cell descriptor. For example, if the table generator 220 reads a cell descriptor that includes a non-zero number of rows and a non-zero number of columns, the generator recognizes that it has scanned the corner cell of a merged cell that has the dimensions indicated by those non-zero numbers. Furthermore, if the table generator reads a cell descriptor that has a zero indicated for the number of columns and/or the number of rows, it knows that it has scanned a cell that is part of a merged cell group.

Turning now to FIG. 27, an exemplary table 2700 of cell descriptors is shown that corresponds to the exemplary document 2300 of FIG. 23. Similar to the exemplary table 2600 of FIG. 26, discussed above, the exemplary table 2700 contains cell indicators that correspond to merged text cells and merged remaining cells. As discussed above with respect to the exemplary document 2300 in FIG. 23, the entire rows and columns of empty cells located beyond the bottom-most edge of the objects in the document 2300 and beyond the right-most edge of the objects in the document 2300 are not included in the merged cell groups in some embodiments of the present invention.

In the exemplary table 2700 of FIG. 27 the cell descriptors for the row and column of empty cells, located in row R7 and in column C7, have been modified accordingly to indicate zero rows, zero columns and no object contents. However in some embodiments of the invention, the cell descriptors may be modified differently or may not be modified from the initial cell descriptor status. Any cell descriptor information that is used to represent the empty row or column cells should indicate to the table generator 220 that these cells are not to be exported, since they do not contain information that is needed to reproduce the document.

The exemplary table 2700 also includes an example of a cell descriptor for a "merged" cell that actually consists of only a single, unmerged cell that did not fall into a group of merged cells. Depending on factors, such as the layout of objects in the document and the manner in which cells are merged by the remaining cell merger 218, there may be cases where single cells remain unmerged that are exported with other merged cells when the document is exported. For example, in the exemplary table 2700, the cell indicator at row R6 in column C1 represents the corresponding single "merged" cell 2314 in the exemplary document 2300 of FIG. 23.

In FIG. 28, an exemplary listing 2800 of an excerpt of HTML table layout code is shown that represents several merged cells that are illustrated in the exemplary document of FIG. 23. As discussed above, for example with respect to step 1302 of the process 1204 in FIG. 13, the table generator 220 creates tags that include the column and row attributes of the table (in the case of HTML format, the "colspan" and "rowspan" attributes) that correspond to the cell descriptor indicator for the number of columns and number of rows of the merged cell. For example, the code on line 1 of the exemplary listing 2800 indicates a "colspan" of six and a "rowspan" of one, which corresponds to the merged cell 2302 in the exemplary document 2300 of FIG. 23. Referring to the corresponding cell descriptors at row R1 in columns C1-C6 of the exemplary table 2700 of FIG. 27, it can be seen that the cell descriptor for the corner cell (at row R1 in column C1) indicates six columns and one row, which corresponds to the "colspan" and "rowspan" in the HTML table listing 2800 of FIG. 28. As discussed above, the table generator 220 can read the cell descriptor information and determine a merged cell group based on a cell descriptor that has a non-zero number of rows and a non-zero number of columns, such as the cell descriptor at row R1 in column C1 of the exemplary table 2700.

Following the tags that include the "colspan" and "rowspan" attributes, in the exemplary listing 2800 of HTML table code, the contents of the merged cells are listed. For example, the code on line 4 represents an image file called "image1.jpg." Referring to merged cell 2302 in the exemplary document 2300 of FIG. 23, this image file can correspond to the image of the part of the picture object 1908 that occupies the merged cell 2302. As another example, the code on line 14 of the listing 2800 represents the formatted text string "This is formatted text." The HTML code in the listing 2800 are simple, exemplary excerpts presented to facilitate the description of exemplary embodiments of the invention. However, one skilled in the art will appreciate any additional HTML code that may be used to implement the invention. Furthermore, one skilled in the art will also appreciate the many possibilities of HTML code that may be used to represent the contents of a document within the scope of the present invention. Furthermore, as discussed above, although certain features of the invention have been described with respect to HTML for exemplary purposes, the invention is not limited to the application of HTML.

Figure 29:
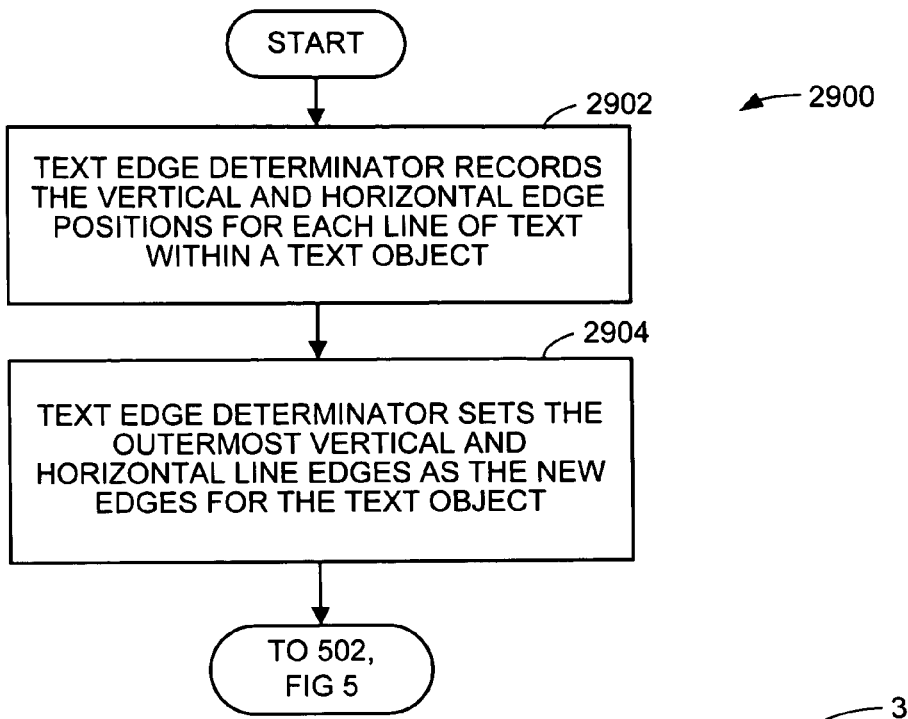
FIG. 29 is a logic flow diagram illustrating a process for recording the edge positions of the document on a per-line basis in accordance with an exemplary embodiment of the present invention.
Figure 30:
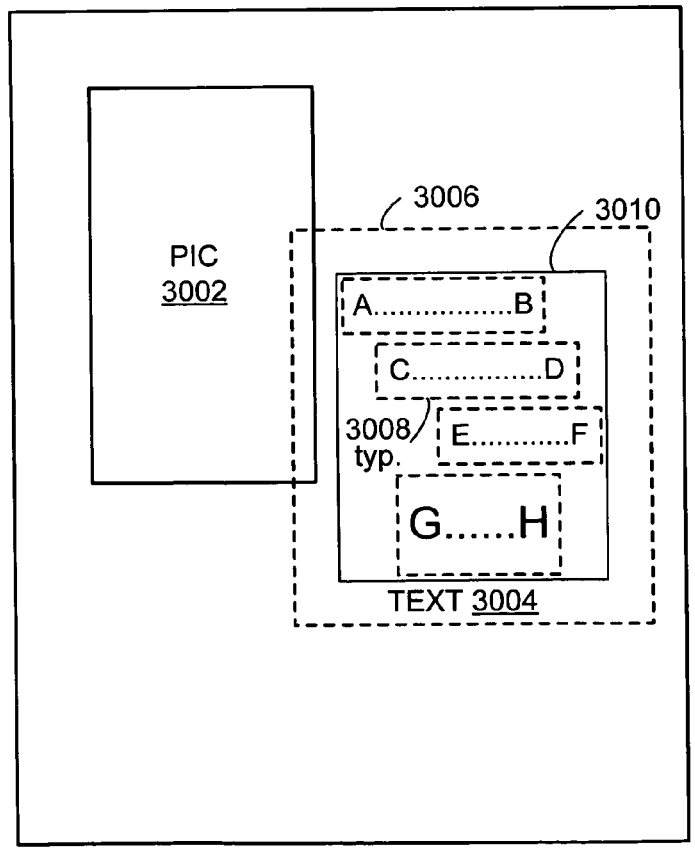
FIG. 30 is an exemplary document showing the difference between the edges recorded for text when recorded on a per-line basis rather than recording the edges of the entire text object.

In FIG. 29 another embodiment is described that includes a process for recording the edge positions of the text in a text box on a per-line basis. Process 2900 starts at step 2902 where text edge determinator 230 shown in FIG. 2 determines the edges associated with each line of text in a text object. Turning briefly to FIG. 30, FIG. 30 includes document 3000 that includes picture object 3002 and text object 3004. Picture object 3002 is shown as overlapping the object boundary 3006, but doesn't overlap the actual text. This is often due to the fact that margins are applied to a text object. Instead of the text being illustrated at the edge of the text object, it is centered in the text object. As a result, the area defined by the boundary of the text object (e.g., 3006) is larger than the area actually occupied by the text. In this embodiment, the horizontal and vertical edge positions for each line of text (e.g., 3008) are determined. As shown, each line of text may have its own associated horizontal and vertical edges within the text object. Once the horizontal and vertical edges corresponding to each line of text are determined, processing proceeds to step 2904 of process 2900.

At step 2904, the edges determined for each line of text are examined to determine the outermost horizontal and vertical edges associated with the lines of text in the text object. In one embodiment, the lines of text are basically logically merged together to form a section of text, where the edges of the section are determined by the outermost edges of the lines included in the section. These outermost edges are then set as the new horizontal and vertical edges for the text of the text object. For example, in FIG. 30, the new horizontal and vertical edges corresponding to the text of text object 3004 are represented by edge boundary 3010. Setting the new horizontal and vertical edges to this new boundary prevent the picture object 3002 from being determined as overlapping the text. Previously, when a picture object (e.g., 3002) overlapped a text object (e.g., 3004) the text and picture were bitmapped together to create an image for transfer no matter the level of overlapping. Bitmapping both objects ensured that they would be rebuilt correctly after exporting. In this embodiment of the present invention, the text is no longer bitmapped with the picture, but is treated separately and is therefore able to retain the editable properties of the text after transfer. This solution also works for when a text object has "wrapping" applied. "Wrapping" refers to a setting that realigns the text within the text object to show the complete text despite the overlapping object. When the overlapping object is rectangular, the edge determination for the text results in a new boundary for the text that is no longer overlapped by the overlapping object. Accordingly, the overlapping object may be bitmapped separately from the text. However, in one embodiment, avoiding bitmapping of the text requires that the overlapping object be rectangular and orientated at a right angle to the document. Diagonal overlapping objects are not compensated for y determining the text edges on a per-line basis. Additionally, determining the positioning of text on a per-line basis also reduces the object area for non-rectangular objects. Non-rectangular objects usually have their text centered in the object. The text may be determined to have its edges within the non-rectangular object, allowing the text to be exported separately from the object. Once the new edges are set for the text object, processing returns to block 502 of FIG. 5 where the edges of the objects in the document continue to be recorded.

FIG. 30 is an exemplary document showing the difference between the edges recorded for text when recorded on a per-line basis rather than recording the edges of the entire text object. Document 3000 includes a picture object 3002 and a text object 3004. Text object 3004 has an object boundary 3006, text lines with individual text line edges 3008, and new vertical and horizontal edge boundary 3010. As described above, boundary 3010 is smaller than the original object boundary 3006, allowing previously overlapping objects to no longer overlap due to the new boundary (3010).

Figure 31:
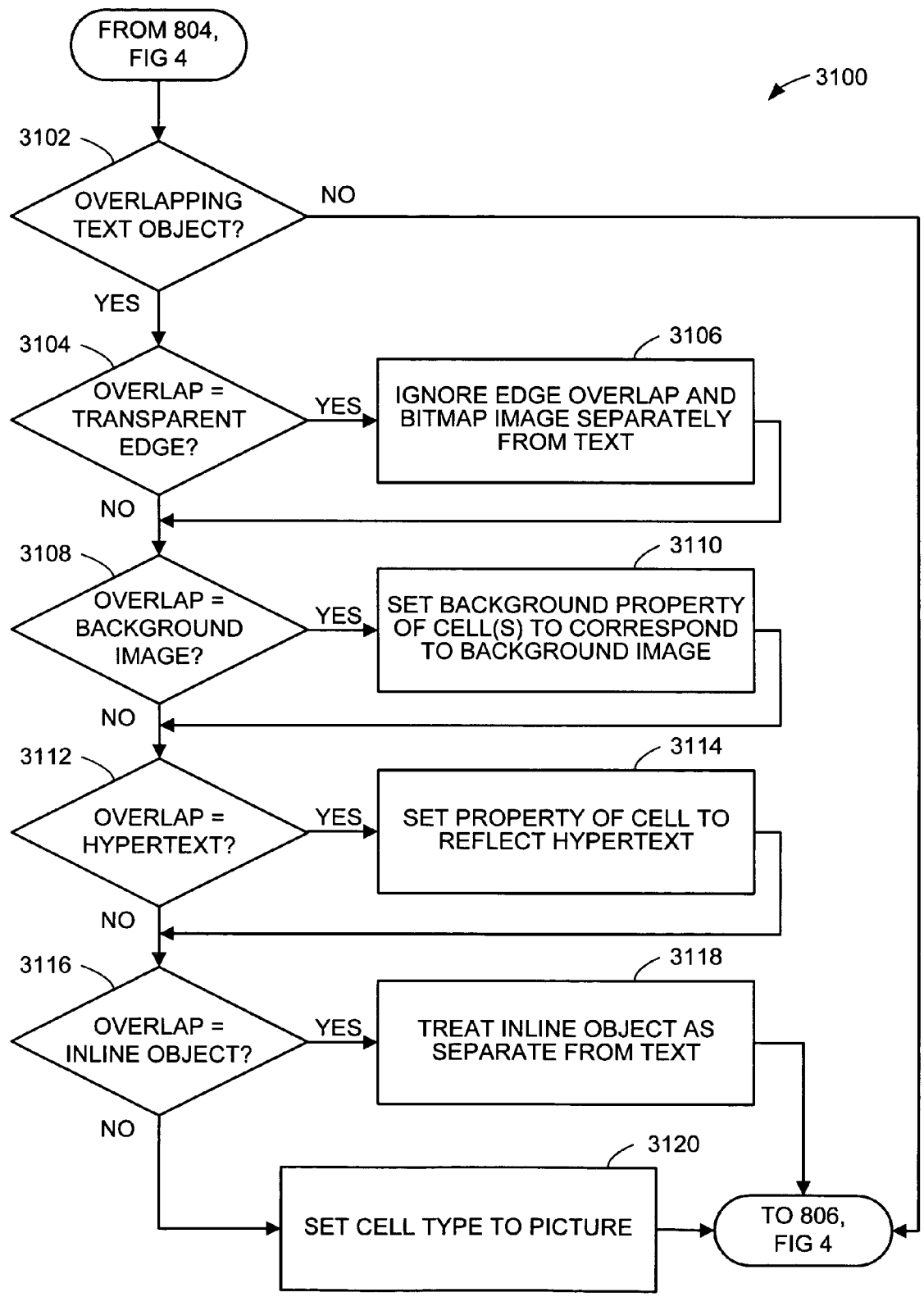
FIG. 31 is a logic flow diagram illustrating a process for avoiding bitmapping of overlapping text objects in accordance with the present invention.

In FIG. 31, an exemplary process is illustrated for avoiding bitmapping of overlapping text objects in accordance with the present invention. Process 3100 begins when the cell descriptor builder has created a cell descriptor to represent each cell corresponding to step 804 of FIG. 8. Processing continues at decision step 3102.

At decision step 3102, a determination is made whether an overlapping text object is present in the document. The text object may be overlapping another object or another object may be overlapping the text object. If no overlapping text object are present in the document, processing proceeds to step 806 of FIG. 8. However, if an overlapping text is present in the document, then processing moves to decision step 3104.

Figure 32:
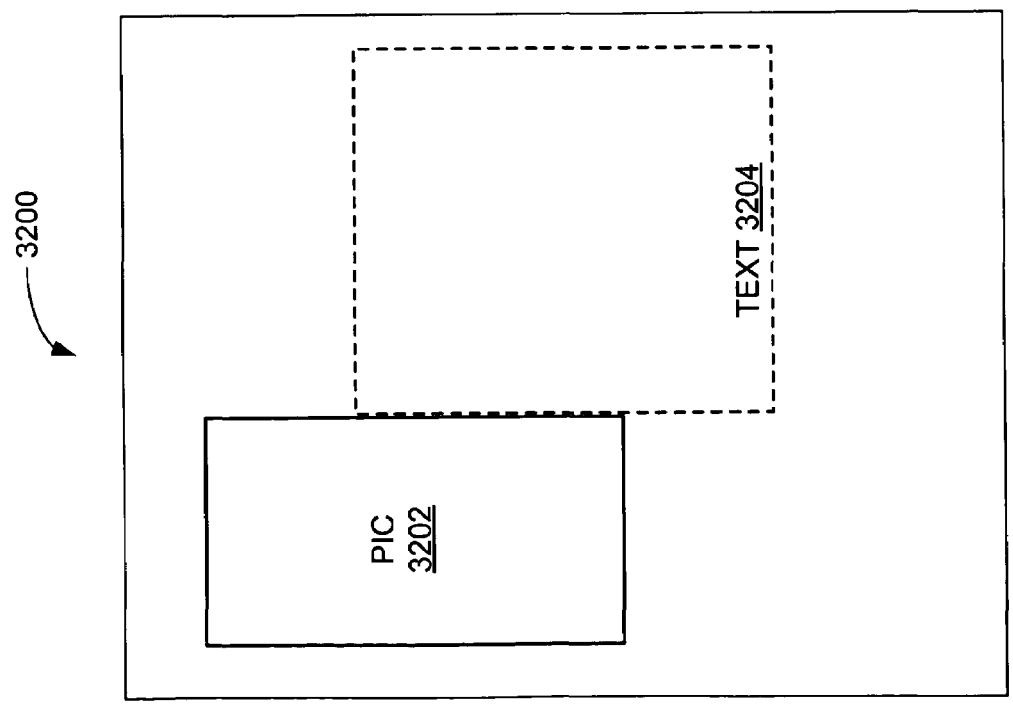
FIG. 32 illustrates an exemplary document comprising two adjacent objects in accordance with the logic flow diagram of FIG. 31.

At decision step 3104, a determination is made whether the overlap of the text object with another object correspond to a transparent edge. In some embodiments, a pixel width may be added to the objects of the document so that any inserted line or graphic boundaries of an object are accounted for and included before transmitting the document to other applications. Turning briefly to FIG. 32, document 3200 illustrates a scenario where the additional pixel width addition to object may cause an error. When two objects are very close, such as picture object 3202 and text object 3204, the added pixel width may result in overlapping objects. Previously, this would cause both objects to be bitmapped for transfer to other application. In contrast, the present invention determines whether this overlap is just manifested as a transparent edge due to the pixel width addition, or if the overlap contains actual text or image data. If the overlap does not just correspond to a transparent edge, processing advances to decision step 3108. However, if the overlap does correspond to a mere transparent edge, processing moves to step 3106.

At step 3106, the transparent edge overlap between the objects is ignored and the cell corresponding to the text object is classified so that the text object is processed as text and not bitmapped with the overlapping object. Processing moves forward from step 3106 to step 3108 to process other overlapping objects.

Figure 33:
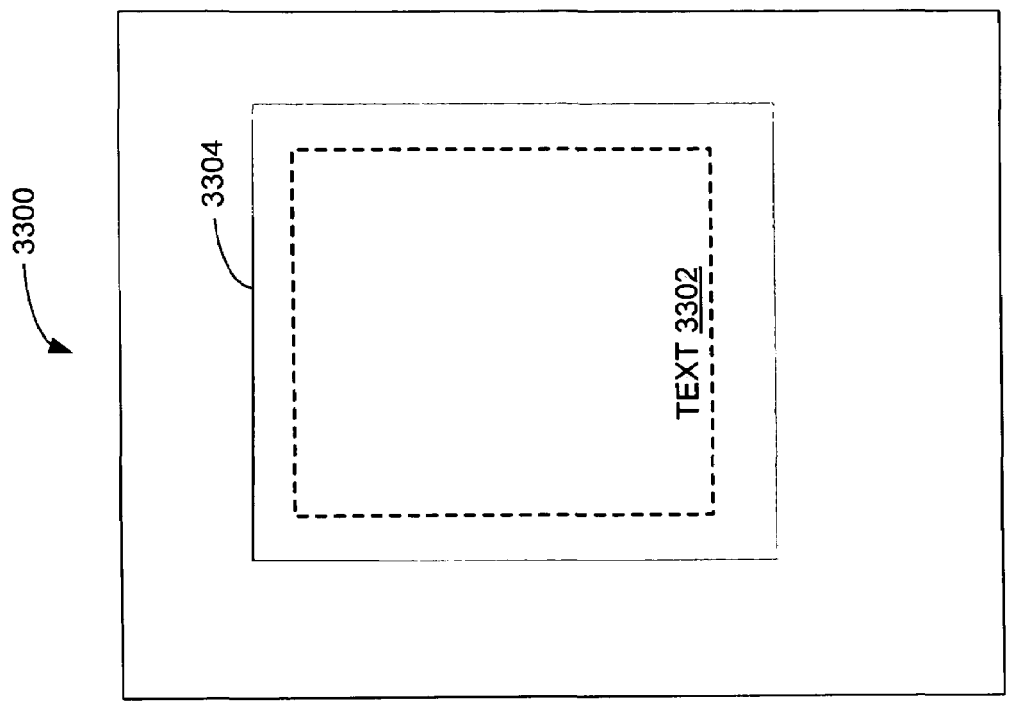
FIG. 33 illustrates an exemplary document comprising a text object with a background object in accordance with the logic flow diagram of FIG. 31.

If the overlap is more than a transparent edge, at decision step 3108, a determination is made whether the text object is overlapping a picture object that can be classified as a background image. Turning to FIG. 33, illustrated is a text object 3302 over a background image 3304. Not all images may be classified as background images, but some common background images correspond to solid colors, tiles, pictures, and the like. If the object overlapped with the text isn't a background image, process advances to decision step 3112. However, if the object overlapped with the text is a background image, then processing moves to step 3110.

Figure 34:
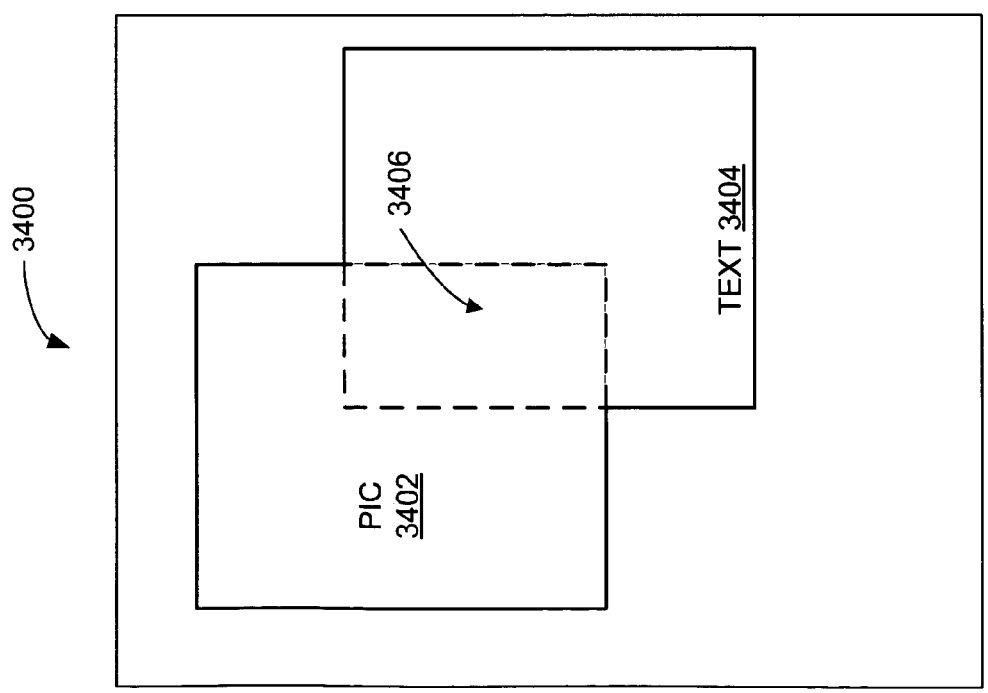
FIG. 34 illustrates an exemplary document comprising a text object with a partial background object in accordance with the logic flow diagram of FIG. 31.

At step 3110, a background property of the text object cells (i.e., cells corresponding to the text object) are set to correspond to the background image. Each cell has corresponding properties, one of which corresponds to a background of the cell. In one embodiment, these properties are manifest through the use of tags in HTML or XML that state the background for the cell. Setting the background property of the text object cells to correspond to the background image avoids having to bitmap the text corresponding to cell, allowing the text to remain editable and reducing the transfer size of the document. In another embodiment, not all background images must completely envelope the text object for a background property to be set. Turning to FIG. 34, document 3400 includes picture object 3402 and text object 3404. A portion (3406) of picture object 3402 shows through text object 3404. Accordingly, what is exported for text object 3404 is the text separated from the images, and an associated background property that references a bitmap that is the background image of text object 3404 including the portion of picture object 3402 showing through text object 3404. In yet another embodiment, the background of a document including a text object may be made of tiles or predictably repeating graphics. In this case, what is exported is an image of one tile, an image for the text object, and the text for reproducing the document. After setting the background property, processing moves forward from step 3110 to step 3112 to process other overlapping objects.

Returning to FIG. 31, if the text is not overlapping an image that can be classified as a background, at decision step 3112 a determination is made whether the overlap between types of objects is because a hyperlink is included in the text. If no hyperlink is included in the text, process advances to decision step 3116. However, if a hyperlink is present in the text, then processing moves to step 3114.

At step 3114, a property of the text object cells (i.e., cells corresponding to the text object) is set to correspond to the hyperlink. After setting the hyperlink property, processing moves forward from step 3114 to step 3116 to process other overlapping objects.

If the text does not include a hyperlink, at decision step 3116, a determination is made whether an inline graphic object is included in the text. If no inline object is included in the text, process advances to step 3120 where the text object cells are set as picture object cells rather than text object cells to compensate for the overlap and then processing moves to process other overlapping objects or to step 806 of FIG. 8.

However, if the overlap is due to an inline object in the text, then the overlap may still be compensated for, and processing moves to step 3118.

At step 3118, the inline object is treated as separate from the text in which the inline object is included. In one embodiment, the inline object is represented by inserted HTML text (e.g., <IMG> tag) in the text object. After setting the inline object property, processing moves forward from step 3118 to process other overlapping objects or to step 806 of FIG. 8.

It is appreciated that process 3100 may be repeated as necessary for additional overlapping text objects without departing from the spirit or scope of the invention. Furthermore the steps shown in process 3100 are not exclusive from one another and one block of text may include inline objects and hyperlinks while partially overlapping some other object. In this case, the inline object is output separately, the hyperlink is set, and a background image is produced.

Figure 35:
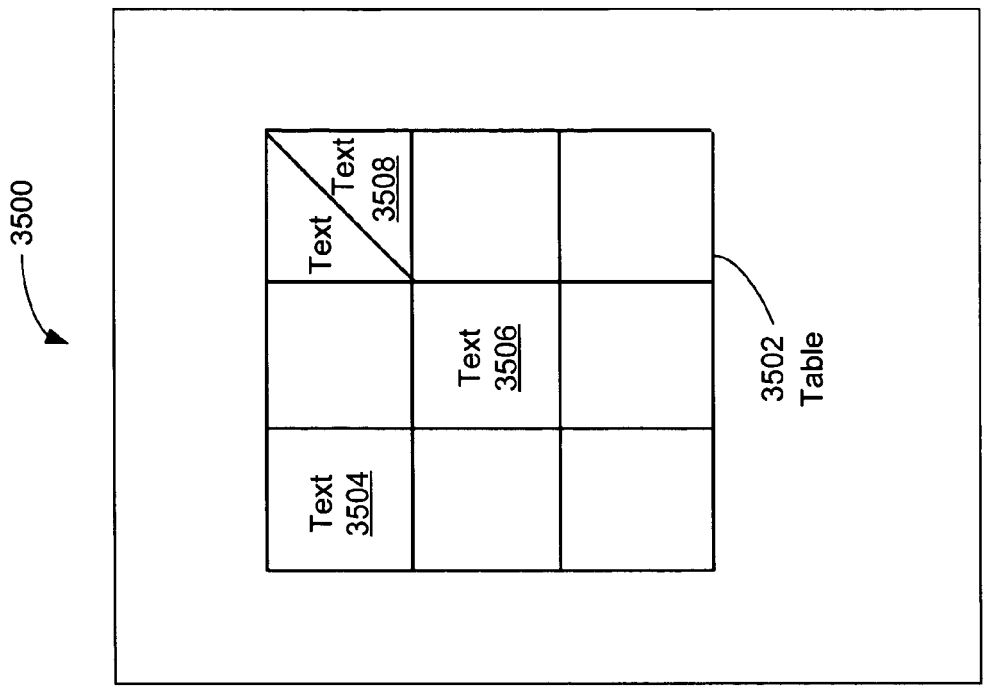
FIG. 35 illustrates an exemplary document comprising a table in accordance with the present invention.

FIG. 32-34 are described above with relation to the logical flow diagram of FIG. 31. FIG. 35 illustrates a document 3500 including table 3502. Each cell (e.g., 3504) of table may have text or objects included. Where previously the entire table would be bitmapped if any cell included an image (i.e., picture), the present invention applies the above principles to first determine the text object positioning on a per-line basis and then determine if any remaining text object overlaps may be ignored or transitioned to properties. In one example, text objects 3504 and 3506 are exported as text while text object 3508 is bitmapped due to the diagonal included in the cell.

In conclusion, the present invention enables the creation of a table version of a document that can be used to export the document to one or more computers in a distributed computer network while maintaining the appearance and text content of the original document. The present invention facilitates the accurate reproduction of documents that are exported to one or more computers in a distributed network through the use of table layouts. The present invention also enables the text from original documents to be maintained as text in the exported documents, thereby allowing the text in the exported documents to be selected and edited, searched using a search function, or manipulated by other text-related functions that may be provided by an application program used to access exported documents.

It will be appreciated that the present invention fulfills the needs described herein and meets the above-stated objects. While there has been shown and described several exemplary embodiments of the present invention, it will be evident to those skilled in the art that various modifications and changes may be made thereto without departing from the spirit and the scope of the present invention as set forth in the appended claims and equivalence thereof. For instance, various aspects of the present invention may be applied to export documents to other application programs run on the same computer.

What is claimed is:

1. A computer-implemented method for creating a table version of a document, the table version of the document comprising a plurality of cells, the method comprising:

determining a position of a text object in a document, wherein the text object includes a first boundary that encompasses a plurality of lines of text, the position being determined according to corresponding horizontal and vertical edge positions for each line of text in the text object;

generating a second boundary for the text object, wherein the second boundary includes the outermost horizontal and vertical edge positions of the lines of text in the text object;

determining whether an object in the document overlaps the second boundary of the text object;

setting a property in a corresponding cell of the table version of the document to a value corresponding to a background image when the overlapping object includes a background image that overlaps the second boundary, wherein the cell is included in the plurality of cells that correspond to the text object in the table version of the document;

setting the property in a corresponding cell of the table version of the document to a value corresponding to hypertext when the overlapping object includes hypertext that overlaps the second boundary, wherein the cell is included in the plurality of cells that correspond to the text object in the table version of the document;

setting the property in a corresponding cell of the table version of the document to a value corresponding to an inline object when the overlapping object includes an inline object that overlaps the second boundary, wherein the cell is included in the plurality of cells that correspond to the text object in the table version of the document;

setting the property in a corresponding cell of the table version of the document to a value corresponding to a picture object when the overlapping object does not include a background image, hypertext or an inline object that overlaps the second boundary, wherein the cell is included in the plurality of cells that correspond to the text object in the table version of the document;

creating the table version of the document based on the text object, the overlapping object and the corresponding set properties; and storing the created table version of the document.

2. The computer-implemented method of claim 1, wherein the first boundary includes a boundary associated with a margin applied to the text object.

3. The computer-implemented method of claim 1, wherein the first boundary defines a larger area than the second boundary.

4. The computer-implemented method of claim 1, wherein the lines of text are merged together to form a section of text and generating a second boundary for the text object includes generating a second boundary for the outermost horizontal and vertical edge positions of the section of text.

5. The computer-implemented method of claim 1, further comprising bitmapping the object in the document and not bitmapping the lines of text when the object of the document overlaps the first boundary and does not overlap the second boundary.

6. The computer-implemented method of claim 1, further comprising determining whether a transparent edge exists between the object of the document and the first boundary and bitmapping the object of the document and not bitmapping the text object when a transparent edge exists.

7. The computer-implemented method of claim 1, wherein the background image includes at least one member of a group comprising: solid colors, tiles and pictures.

8. A computer system for creating a table version of a document, the table version of the document comprising a plurality of cells, the document comprising a text object, the text object comprising a first boundary, the system comprising:

a processing unit;

a memory in communication with the processing unit; and a program stored in the memory for providing instructions to the processing unit, the processing unit responsive to the instructions of the program, the instructions comprising:

recording a position for each vertical edge of each line of text in the text object;

recording a position for each horizontal edge of each line of text in the text object;

generating a second boundary for the text object, wherein the second boundary includes the outermost horizontal and vertical edge positions of the lines of text in the text object;

determining whether an object in the document overlaps the second boundary of the text object;

setting a property in a corresponding cell of the table version of the document to a value corresponding to a background image when the overlapping object includes a background image that overlaps the second boundary, wherein the cell is included in the plurality of cells that correspond to the text object in the table version of the document;

setting the property in a corresponding cell of the table version of the document to a value corresponding to hypertext when the overlapping object includes hypertext that overlaps the second boundary, wherein the cell is included in the plurality of cells that correspond to the text object in the table version of the document;

setting the property in a corresponding cell of the table version of the document to a value corresponding to an inline object when the overlapping object includes an inline object that overlaps the second boundary, wherein the cell is included in the plurality of cells that correspond to the text object in the table version of the document;

setting the property in a corresponding cell of the table version of the document to a value corresponding to a picture object when the overlapping object does not include a background image, hypertext or an inline object that overlaps the second boundary, wherein the cell is included in the plurality of cells that correspond to the text object in the table version of the document;

forming the table version of the document based on the text object, the overlapping object and the corresponding set properties; and storing the table version of the document in the memory.

9. The computer system of claim 8, wherein the first boundary includes a boundary associated with a margin applied to the text object.

10. The computer system of claim 8, wherein the first boundary defines a larger area than the second boundary.

11. The computer system of claim 8, wherein the lines of text are merged together to form a section of text and generating a second boundary for the text object includes generating a second boundary for the outermost horizontal and vertical edge positions of the section of text.

12. The computer system of claim 8, further comprising bitmapping the object in the document and not bitmapping the lines of text when the object of the document overlaps the first boundary and does not overlap the second boundary.

13. The computer system of claim 8, further comprising determining whether a transparent edge exists between the object of the document and the first boundary and bitmapping the object of the document and not bitmapping the text object when a transparent edge exists.

14. The computer system of claim 8, wherein the background image includes at least one member of a group comprising: solid colors, tiles and pictures.

15. A computer-readable medium having computer-executable instructions for creating a table version of a document, the table version of the document comprising a plurality of cells, the instructions comprising:

determining a position of a text object in the document, wherein the text object includes a first boundary that encompasses a plurality of lines of text, the position being determined according to corresponding horizontal and vertical edge positions for each line of text in the text object;

generating a second boundary for the text object, wherein the second boundary includes the outermost horizontal and vertical edge positions of the lines of text in the text object;

determining whether an object in the document overlaps the second boundary of the text object;

setting a property in a corresponding cell of the table version of the document to a value corresponding to a background image when the overlapping object includes a background image that overlaps the second boundary, wherein the cell is included in the plurality of cells that correspond to the text object in the table version of the document;

setting the property in a corresponding cell of the table version of the document to a value corresponding to hypertext when the overlapping object includes hypertext that overlaps the second boundary, wherein the cell is included in the plurality of cells that correspond to the text object in the table version of the document;

setting the property in a corresponding cell of the table version of the document to a value corresponding to an inline object when the overlapping object includes an inline object that overlaps the second boundary, wherein the cell is included in the plurality of cells that correspond to the text object in the table version of the document;

setting the property in a corresponding cell of the table version of the document to a value corresponding to a picture object when the overlapping object does not include a background image, hypertext or an inline object that overlaps the second boundary, wherein the cell is included in the plurality of cells that correspond to the text object in the table version of the document;

creating the table version of the document based on the text object, the overlapping object and the corresponding set properties; and storing the created table version of the document.

16. The computer-readable medium of claim 15, wherein the first boundary includes a boundary associated with a margin applied to the text object.

17. The computer-readable medium of claim 15, wherein the first boundary defines a larger area than the second boundary.

18. The computer-readable medium of claim 15, wherein the lines of text are merged together to form a section of text and generating a second boundary for the text object includes generating a second boundary for the outermost horizontal and vertical edge positions of the section of text.

19. The computer-readable medium of claim 15, further comprising bitmapping the object in the document and not bitmapping the lines of text when the object of the document overlaps the first boundary and does not overlap the second boundary.

20. The computer-readable medium of claim 15, further comprising determining whether a transparent edge exists between the object of the document and the first boundary and bitmapping the object of the document and not bitmapping the text object when a transparent edge exists.

* * * * *